US012675972B2

(12) United States Patent
Kitamura et al.

(10) Patent No.: US 12,675,972 B2
(45) Date of Patent: Jul. 7, 2026

(54) IMAGE PROCESSING DEVICE, IMAGE PROCESSING METHOD, AND STORAGE MEDIUM

(71) Applicant: CANON KABUSHIKI KAISHA, Tokyo (JP)

(72) Inventors: Kazuya Kitamura, Kanagawa (JP); Tokuro Nishida, Kanagawa (JP); Koki Nakamura, Tokyo (JP); Hiroyuki Hasegawa, Chiba (JP); Kengo Takeuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 18/150,643

(22) Filed: Jan. 5, 2023

(65) Prior Publication Data

US 2023/0222765 A1     Jul. 13, 2023

(30) Foreign Application Priority Data

Jan. 7, 2022     (JP) ................................. 2022-001906

(51) Int. Cl.
| | |
|---|---|
| *G06V 10/74* | (2022.01) |
| *G02B 7/04* | (2021.01) |
| *G06V 10/80* | (2022.01) |
| *H04N 5/04* | (2006.01) |

(52) U.S. Cl.
CPC ............. *G06V 10/761* (2022.01); *G02B 7/04* (2013.01); *G06V 10/803* (2022.01); *H04N 5/04* (2013.01)

(58) Field of Classification Search
None
See application file for complete search history.

(56) References Cited

U.S. PATENT DOCUMENTS

| | | | | |
|---|---|---|---|---|
| 2003/0122951 A1* | 7/2003 | Hara | ........................ | H04N 5/20 |
| | | | | 348/E5.073 |
| 2011/0141233 A1* | 6/2011 | Tsukagoshi | .......... | H04N 13/194 |
| | | | | 348/E13.001 |
| 2011/0298935 A1* | 12/2011 | Segal | .................... | H04N 5/2222 |
| | | | | 348/207.1 |
| 2012/0030448 A1* | 2/2012 | Lieske | ................. | H04N 19/436 |
| | | | | 712/E9.034 |
| 2013/0002812 A1* | 1/2013 | Bhat | .................... | H04N 13/194 |
| | | | | 348/43 |

(Continued)

FOREIGN PATENT DOCUMENTS

| | | |
|---|---|---|
| EP | 2988488 A1 | 2/2016 |
| JP | 2010081001 A | 4/2010 |

(Continued)

*Primary Examiner* — Soo Shin
(74) *Attorney, Agent, or Firm* — Canon U.S.A., Inc. IP Division

(57) ABSTRACT

An image processing device including an image acquisition unit configured to acquire an image containing a subject via a lens unit; a distance information acquisition unit configured to acquire distance information indicating a distance to the subject; an auxiliary data generation unit configured to generate auxiliary data related to the distance information; a data stream generation unit configured to generate a data stream in which the image, the distance information, and the auxiliary data are superimposed; and an output unit configured to output the data stream to outside.

24 Claims, 22 Drawing Sheets

(56) References Cited

U.S. PATENT DOCUMENTS

| | | | |
|---|---|---|---|
| 2015/0326873 A1* | 11/2015 | Tan ..................... | H04N 21/236 |
| | | | 375/240.12 |
| 2019/0191003 A1 | 6/2019 | Harrang | |
| 2022/0159190 A1* | 5/2022 | Asukabe ................ | G03B 17/18 |
| 2023/0216983 A1* | 7/2023 | Nakamura ........... | H04N 25/704 |
| | | | 348/239 |
| 2024/0164706 A1* | 5/2024 | Baba .................... | A61B 1/0638 |

FOREIGN PATENT DOCUMENTS

| | | | |
|---|---|---|---|
| JP | 2013055395 A | 3/2013 |
| JP | 2016045240 A | 4/2016 |
| JP | 2021048560 A | 3/2021 |

* cited by examiner

FIG. 2A

| R | Gr | R | Gr | R | Gr | R | Gr | R | Gr |
|----|----|----|----|----|----|----|----|----|----|
| Gb | B | Gb | B | Gb | B | Gb | B | Gb | B |

FIG. 2B

| R A | R B | Gr A | Gr B | R A | R B | Gr A | Gr B | R A | R B | Gr A | Gr B | R A | R B | Gr A | Gr B | R A | R B | Gr A | Gr B |
|----|----|----|----|----|----|----|----|----|----|----|----|----|----|----|----|----|----|----|----|
| Gb A | Gb B | B A | B B | Gb A | Gb B | B A | B B | Gb A | Gb B | B A | B B | Gb A | Gb B | B A | B B | Gb A | Gb B | B A | B B |

FIG. 7

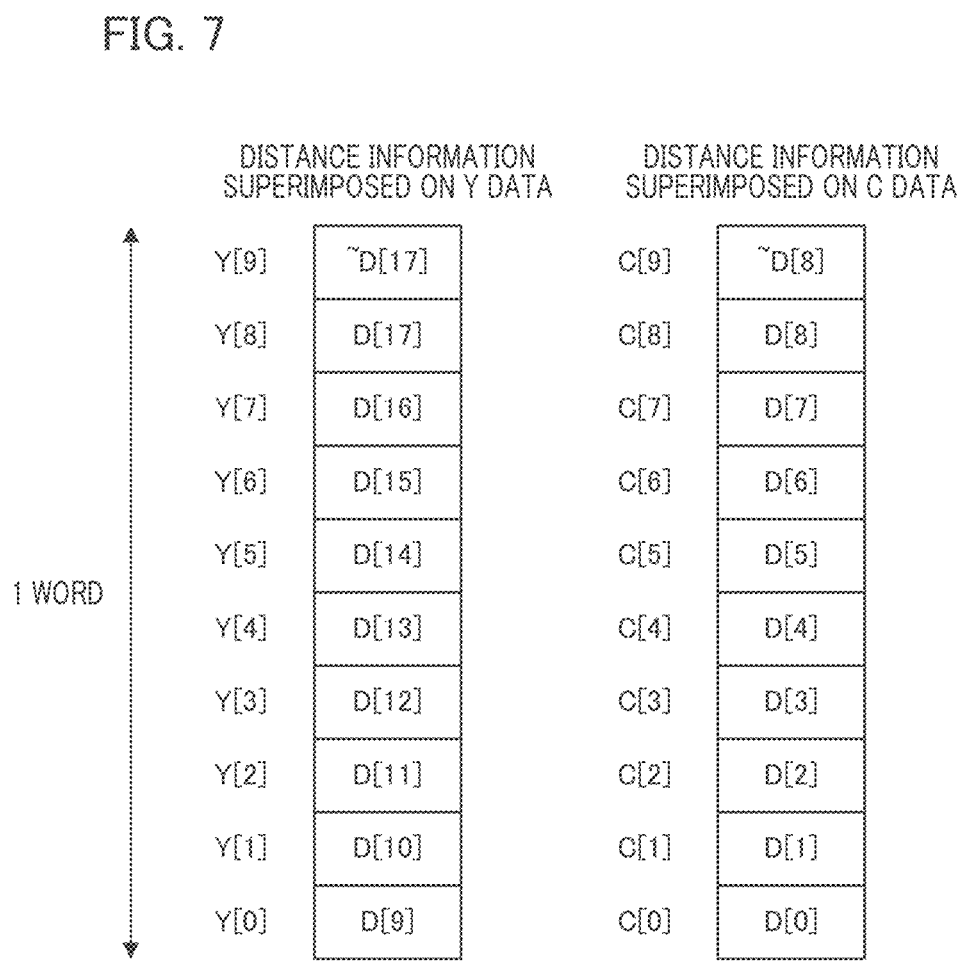

DISTANCE INFORMATION
SUPERIMPOSED ON Y DATA

DISTANCE INFORMATION
SUPERIMPOSED ON C DATA

| | Y | D | | C | D |
|---|---|---|---|---|---|
| | Y[9] | ~D[17] | | C[9] | ~D[8] |
| | Y[8] | D[17] | | C[8] | D[8] |
| | Y[7] | D[16] | | C[7] | D[7] |
| | Y[6] | D[15] | | C[6] | D[6] |
| 1 WORD | Y[5] | D[14] | | C[5] | D[5] |
| | Y[4] | D[13] | | C[4] | D[4] |
| | Y[3] | D[12] | | C[3] | D[3] |
| | Y[2] | D[11] | | C[2] | D[2] |
| | Y[1] | D[10] | | C[1] | D[1] |
| | Y[0] | D[9] | | C[0] | D[0] |

Type 2

FIG. 11

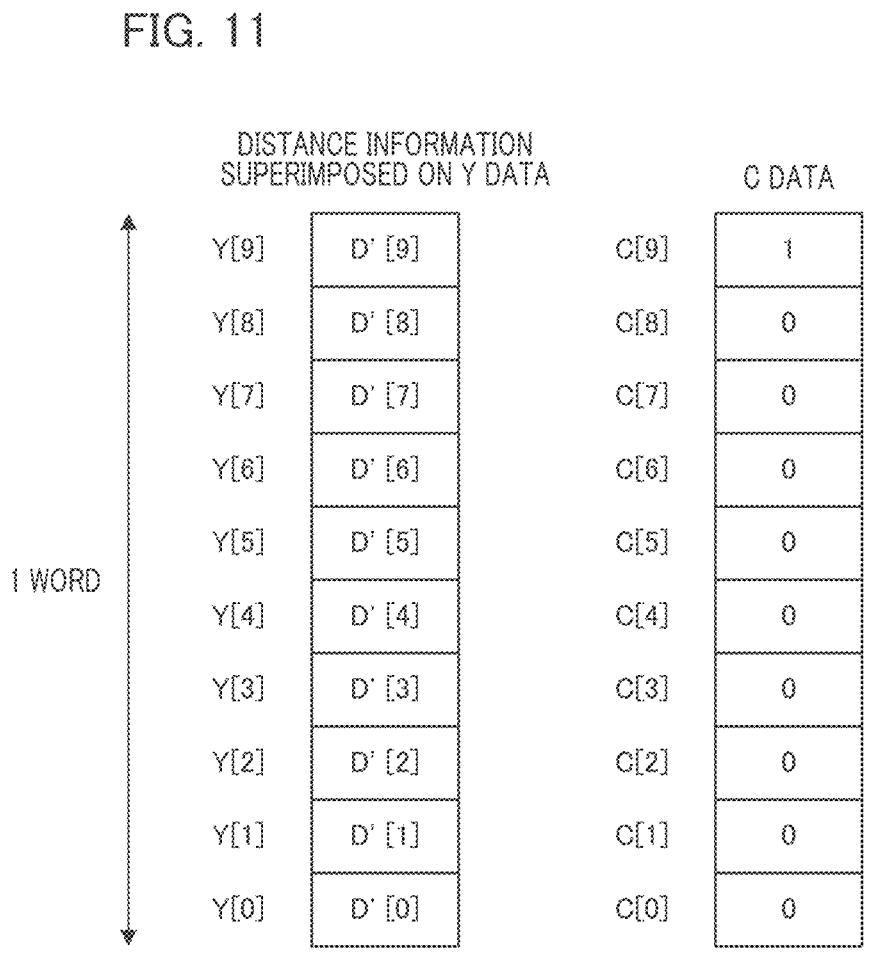

| | DISTANCE INFORMATION SUPERIMPOSED ON Y DATA | | C DATA |
|---|---|---|---|
| Y[9] | D' [9] | C[9] | 1 |
| Y[8] | D' [8] | C[8] | 0 |
| Y[7] | D' [7] | C[7] | 0 |
| Y[6] | D' [6] | C[6] | 0 |
| Y[5] | D' [5] | C[5] | 0 |
| Y[4] | D' [4] | C[4] | 0 |
| Y[3] | D' [3] | C[3] | 0 |
| Y[2] | D' [2] | C[2] | 0 |
| Y[1] | D' [1] | C[1] | 0 |
| Y[0] | D' [0] | C[0] | 0 |

1 WORD 10 bits    10 bits    10 bits    10 bits

R STREAM    G STREAM    B STREAM    A STREAM

FIG. 16

| | R DATA | G DATA | B DATA | DISTANCE INFORMATION SUPERIMPOSED ON A DATA |
|---|---|---|---|---|
| R[9] | R[9] | G[9] | [9] | A[9] D'[9] |
| R[8] | R[8] | G[8] | [8] | A[8] D'[8] |
| R[7] | R[7] | G[7] | [7] | A[7] D'[7] |
| R[6] | R[6] | G[6] | [6] | A[6] D'[6] |
| R[5] | R[5] | G[5] | [5] | A[5] D'[5] |
| R[4] | R[4] | G[4] | [4] | A[4] D'[4] |
| R[3] | R[3] | G[3] | [3] | A[3] D'[3] |
| R[2] | R[2] | G[2] | [2] | A[2] D'[2] |
| R[1] | R[1] | G[1] | [1] | A[1] D'[1] |
| R[0] | R[0] | G[0] | [0] | A[0] D'[0] |

1 WORD

FIG. 19

| | DISTANCE INFORMATION SUPERIMPOSED ON Y DATA | | DISTANCE INFORMATION SUPERIMPOSED ON C DATA |
|---|---|---|---|
| Y[9] | ~D[17] | C[9] | 1 |
| Y[8] | D[17] | C[8] | 0 |
| Y[7] | D[16] | C[7] | 0 |
| Y[6] | D[15] | C[6] | 0 |
| Y[5] | 0 | C[5] | 0 |
| Y[4] | 0 | C[4] | 0 |
| Y[3] | 0 | C[3] | 0 |
| Y[2] | 0 | C[2] | 0 |
| Y[1] | 0 | C[1] | 0 |
| Y[0] | 0 | C[0] | 0 |

1 WORD

FIG. 20

DISTANCE INFORMATION
SUPERIMPOSED ON Y DATA

C DATA

| 1 WORD | Y[9] | D'' [9] | C[9] | 1 |
|---|---|---|---|---|
| | Y[8] | D'' [8] | C[8] | 0 |
| | Y[7] | D'' [7] | C[7] | 0 |
| | Y[6] | D'' [6] | C[6] | 0 |
| | Y[5] | D'' [5] | C[5] | 0 |
| | Y[4] | D'' [4] | C[4] | 0 |
| | Y[3] | D'' [3] | C[3] | 0 |
| | Y[2] | D'' [2] | C[2] | 0 |
| | Y[1] | D'' [1] | C[1] | 0 |
| | Y[0] | D'' [0] | C[0] | 0 |

FIG. 22

|  | Y DATA |
|---|---|
| Y[9] | 1 |
| Y[8] | 0 |
| Y[7] | 0 |
| Y[6] | 0 |
| Y[5] | 0 |
| Y[4] | 0 |
| Y[3] | 0 |
| Y[2] | 0 |
| Y[1] | 0 |
| Y[0] | 0 |

1 WORD

DISTANCE INFORMATION
SUPERIMPOSED ON C DATA

|  |  |
|---|---|
| C[9] | D" [9] |
| C[8] | D" [8] |
| C[7] | D" [7] |
| C[6] | D" [6] |
| C[5] | D" [5] |
| C[4] | D" [4] |
| C[3] | D" [3] |
| C[2] | D" [2] |
| C[1] | D" [1] |
| C[0] | D" [0] |

IMAGE PROCESSING DEVICE, IMAGE PROCESSING METHOD, AND STORAGE MEDIUM

BACKGROUND

Field of the Disclosure

The present disclosure relates to an image processing device, an image processing method, and a storage medium.

Description of the Related Art

In recent years, as image combination technologies generally used for movies or television, there are methods, called chroma-key combination, of making specific color portions of images transparent and combining different images in the transparent specific color portions. When images for chroma-key combination are captured, it is necessary to prepare specific color backgrounds such as greenback or blueback. It is also necessary to perform work for smoothing out creases so that color irregularity does not occur in the backgrounds and adjusting illumination.

When light reflected from greenback is shown in a subject, background separation cannot be performed proficiently in some cases. Accordingly, it is also necessary to perform work such as elimination of reflection of the reflected light through postprocessing after the imaging.

On the other hand, as image combination technologies used recently, there are methods of separating subjects from backgrounds based on distance information regarding distances to the subjects and combining the subjects with other images. When these methods are used, it is not necessary to prepare backgrounds such as greenback and it is not necessary to perform troublesome work for the above-described chroma-key.

As methods of generating distance information regarding distances to subjects, for example, there are methods of measuring distances to subjects using devices including distance sensors apart from imaging devices that capture images. In this case, since angles of field or resolutions are different between devices, it is necessary to perform calibration work before imaging in order to combine images through postprocessing.

On the other hand, Japanese Unexamined Patent Publication No. 2021-48560 discloses a technology for generating distance information indicating a distance between an imaging device and a subject by using an image sensor that has a distance measurement function in conformity with a scheme for an imaging plane difference. When this technology is used, image capturing and generation of distance information can be simultaneously performed with one image sensor. Therefore, it is not necessary to perform the above-described calibration work.

However, in Japanese Unexamined Patent Publication No. 2021-48560, it is not considered how distance information is output to perform image combination or the like through post-processing.

There is a need in the art in view of such circumstances to provide an image processing device appropriate for outputting distance information or the like available for image combination or the like to the outside.

SUMMARY

To solve the above issue, according to one aspect of the present disclosure, an image processing device includes an image acquisition unit configured to acquire an image containing a subject via a lens unit; at least one processor configured to function as: a distance information acquisition unit configured to acquire distance information indicating a distance to the subject; an auxiliary data generation unit configured to generate auxiliary data related to the distance information; a data stream generation unit configured to generate a data stream in which the image, the distance information, and the auxiliary data are superimposed; and an output unit configured to output the data stream to outside.

Further features of the present disclosure will become apparent from the following description of embodiments with reference to the attached drawings.

BRIEF DESCRIPTION OF THE DRAWINGS

FIG. 2A is a diagram illustrating exemplary color filters arranged on a light reception surface of an image sensor and FIG. 2B is a diagram illustrating an example in which two photoelectric conversion units (photodiodes) are arranged in each pixel to correspond to the array of the color filters of FIG. 2A.

FIG. 7 is a diagram illustrating a superimposition example of distance information according to the first embodiment.

FIG. 11 is a diagram illustrating a superimposition example of distance information according to the second embodiment.

FIG. 16 is a diagram illustrating a superimposition example of distance information according to the third embodiment.

FIG. 19 is a diagram illustrating a superimposition example of the distance information in a highly precise distance information output mode according to the fifth embodiment.

FIG. 20 is a diagram illustrating a superimposition example of the distance information in a grayscale output mode according to the fifth embodiment.

FIG. 22 is a diagram illustrating a superimposition example of the distance information in a heatmap output mode according to the fifth embodiment.

DESCRIPTION OF THE EMBODIMENTS

Hereinafter, with reference to the accompanying drawings, favorable modes of the present disclosure will be described using Embodiments. In each diagram, the same reference signs are applied to the same members or elements, and duplicate description will be omitted or simplified.

In embodiments, an example in which a digital camera is applied as an image processing device will be described. However, image processing devices include electronic devices that have an imaging function, such as a network camera, a smartphone with a camera, a tablet computer with a camera, an in-vehicle camera, a drone camera, a camera mounted on a robot, or the like. An image in the embodiments may be not only a still image but also a video such as a moving image.

First Embodiment

Figure 1:
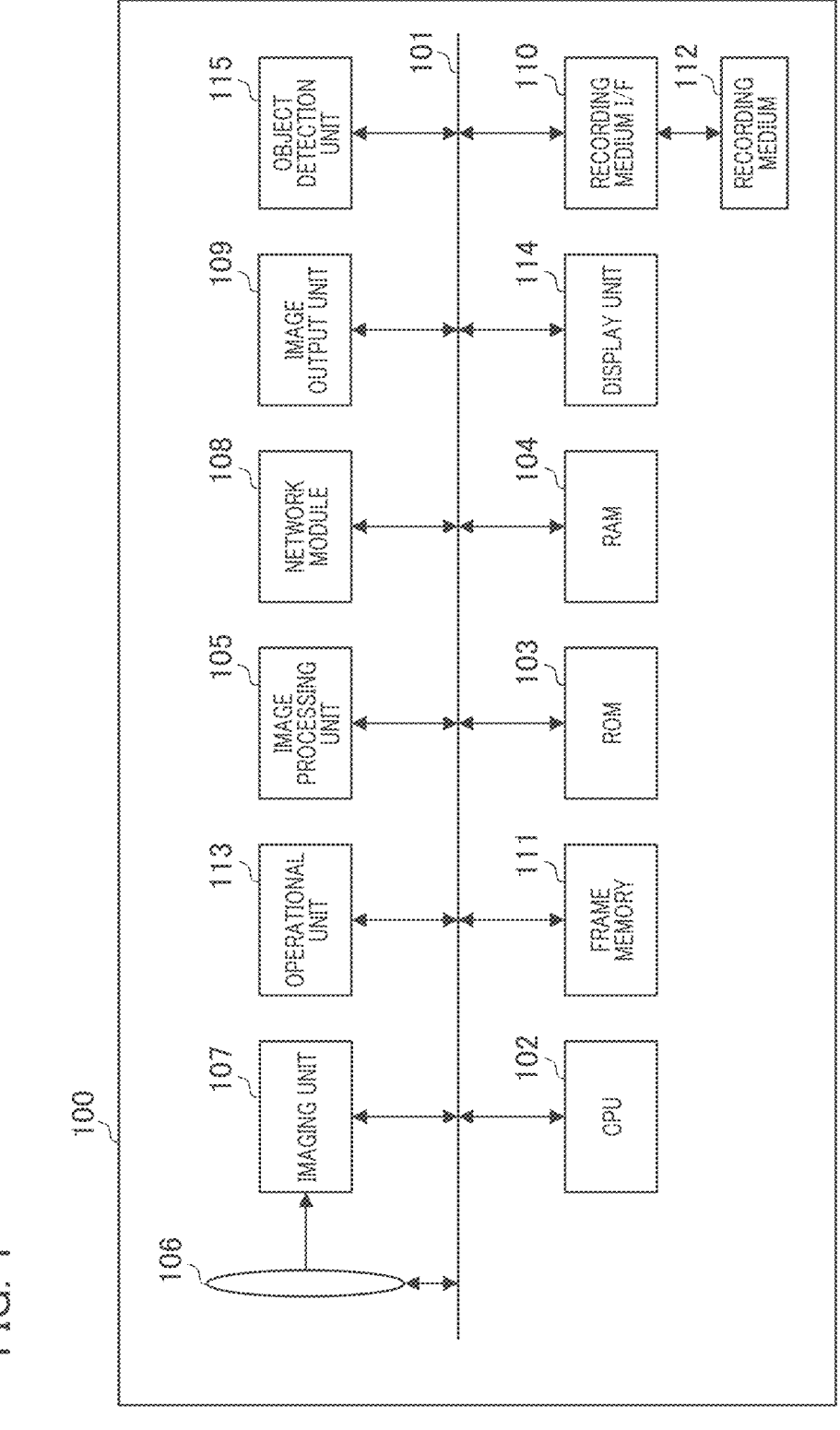
FIG. 1 is a block diagram illustrating an image processing device according to a first embodiment.

FIG. 1 is a block diagram illustrating an image processing device according to a first embodiment. In FIG. 1, an image processing device 100 is a device that can input, output, and record an image and is configured as, for example, a digital camera.

In FIG. 1, a CPU 102 serving as a computer, a ROM 103, a RAM 104, an image processing unit 105, a lens unit 106, an imaging unit 107, a network module 108, and an image output unit 109 are connected to an internal bus 101.

A recording medium interface (I/F) 110, an object detection unit 115, and the like are connected to the internal bus 101. The blocks connected to the internal bus 101 are configured to transmit and receive data to one another via the internal bus 101.

Some of the blocks illustrated in FIG. 1 are implemented by causing the CPU serving as the computer included in the image processing device to execute a computer program stored in a memory such as a ROM serving as a storage medium. However, some or all of the blocks may be implemented by hardware.

As the hardware, a dedicated circuit (ASIC), a processor (a reconfigurable processor or a DSP), or the like can be used. The blocks illustrated in FIG. 1 may not be contained in the same casing or may be configured with other devices connected to each other via a signal line.

The lens unit 106 is a unit that is formed from a lens group including a zoom lens and a focus lens, a diaphragm mechanism, and a driving motor. An optical image passing through the lens unit 106 is formed on a light reception surface of the imaging unit 107. The imaging unit 107 functions as an image acquisition unit that acquires an image containing a subject and includes an image sensor such as a CCD image sensor or a CMOS image sensor.

An optical image formed on the light reception surface of the image sensor is converted into an imaging signal and further converted into a digital signal to be output. The image sensor according to the present embodiment is a sensor that has an image surface phase difference detection function, and details of the image sensor will be described below.

The CPU 102 serving as the computer controls each unit of the image processing device 100 using the RAM 104 as a working memory in accordance with a computer program stored in the ROM 103.

Processes of the flowcharts of FIGS. 3, 9, 10, 15, 17, and 18 are performed in accordance with computer programs stored in the ROM 103. The ROM 103 is a nonvolatile semiconductor memory, on which a computer program causing the CPU 102 to operate, various adjustment parameters, and the like are recorded.

The RAM 104 is a volatile semiconductor memory, and a memory which has a slower speed or a smaller capacity than the frame memory 111 is used. The frame memory 111 is a semiconductor memory capable of temporarily storing image signals and reading the image signals as necessary.

Since the image signals are a vast amount of data, a memory that has a high bandwidth and a large capacity is required. Here, a dual data rate 4 synchronous dynamic RAM (DDR4-SDRAM) or the like is used. By using the frame memory 111, it is possible to perform, for example, a process of combining temporally different images or cutting only a region.

The image processing unit 105 performs various types of image processing on data from the imaging unit 107 or image data stored in the frame memory 111 or the recording medium 112 under the control of the CPU 102. The image processing performed by the image processing unit 105 includes pixel interpolation of image data, a coding process, a compression process, a decoding process, an expansion/contraction process (resizing), a noise reduction process, and a color conversion process.

The image processing unit 105 performs a correction process such as correction of a variation in characteristics of pixels of the imaging unit 107, correction of defective pixels, correction of white balance, correction of luminance, or correction of distortion or a decrease in a peripheral light amount occurring due to characteristics of a lens.

The image processing unit 105 generates a distance map. Details of the distance map will be described below. The image processing unit 105 may be configured with a dedicated circuit block that performs specific image processing. Depending on a type of image processing, the CPU 102 can also perform the image processing in accordance with a program without using the image processing unit 105.

Based on an image processing result in the image processing unit 105, the CPU 102 controls the lens unit 106 such that a diaphragm or the like adjusting a focal distance or an amount of light or optical expansion of an image is adjusted. Camera shake correction may be performed by moving a part of the lens group on a plane perpendicular to an optical axis.

Reference numeral 113 denotes an operational unit that serves as an interface with the outside of the device and receives a user operation. The operational unit 113 is configured with an element such as a mechanical button, switch, or the like and includes a power switch and a mode switching switch.

Reference numeral 114 denotes a display unit that displays an image. For example, an image processed by the image processing unit 105, a setting menu, or an operation status of the image processing device 100 can be confirmed. As the display unit 114, a device such as a liquid crystal display (LCD) or an organic electro luminescence (EL) display which is miniature and has small power consumption is used.

Further, a touch panel structure in which a resistive membrane type or electrostatic capacity type thin film element or the like may be used as a part of the operational unit 113.

The CPU 102 generates a text string for informing a user of a setting state or the like of the image processing device 100 or a menu for setting the image processing device 100, superimposes the text string or the menu to be superimposed on an image processed by the image processing unit 105, causes the display unit 114 to display the text string or the menu superimposed on the image. In addition to the text information, imaging assist display such as a histogram, a vector scope, a waveform monitor, a zebra, peaking, or false color may be superimposed.

Reference numeral 109 denotes an image output unit. A serial digital interface (SDI), a High-Definition Multimedia Interface (HDMI: registered trademark), or the like is used as an interface. Alternatively, an interface such as Display-Port (registered trademark) may be used. A real-time image may be displayed on an external display device (a display) via the image output unit 109.

The network module 108 capable of transmitting a control signal in addition to an image is also included. The network module 108 is an interface used to input and output an image signal or an audio signal. The network module 108 can also communicate with an external device via the Internet or the like to transmit and receive various types of data such as a file or a command. The network module 108 may be a wireless or wired network module.

The image processing device 100 has a function of performing recording inside the body in addition to outputting an image to the outside. The recording medium 112 can record image data or various types of setting data, is a large capacity storage element such as a hard disk drive (HDD) or a solid-state drive (SSD), and can be mounted on the recording medium I/F 110.

The object detection unit 115 is a block that detects an object. For example, artificial intelligence typified by deep learning using a neural network is used to detect an object. When an object is detected by deep learning, the CPU 102 transmits a program for a process stored in the ROM 103, a network structure of an SSD, YOLO, a weight parameter, or the like to the object detection unit 115.

"SSD" is an abbreviation for "single shot multibox detector" and "YOLO" is an abbreviation for "you only look once." The object detection unit 115 performs a process of detecting an object from an image signal based on various parameters obtained from the CPU 102 and loads a processing result on the RAM 104.

FIG. 2A is a diagram illustrating exemplary color filters arranged on a light reception surface of an image sensor. In FIG. 2A, a Bayer array of red (R), blue (B), and green (Gb and Gr) is illustrated. In the image sensor, a plurality of pixels are arrayed 2-dimensionally. One of the color filters of R, B, Gb, and Gr is disposed on the front surface of each pixel as in FIG. 2A.

In FIG. 2A, only a color filter array of two rows is illustrated, but the color filter array is repeatedly arranged for every two rows in a vertical scanning direction.

A micro lens is arranged on the front surface of the color filter arranged on the front surface of each pixel of the image sensor. Each pixel includes two photoelectric conversion units (photodiodes A and B) arranged in row in a horizontal scanning direction.

FIG. 2B is a diagram illustrating an example in which two photoelectric conversion units (photodiodes) are arranged in each pixel to correspond to the array of the color filters of FIG. 2A. In FIG. 2B, each pixel is configured with a pair of photodiodes A and B and color filters of the same color are arranged in the two paired photodiodes.

The photodiodes A and B each receive light fluxes from different exit pupils of an optical system via the micro lenses.

In the image sensor according to the present embodiment, A image signals can be acquired from the plurality of photodiodes A of the pixels lined up in the row direction. Similarly, B image signals can be acquired from the plurality of photodiodes B of the pixels lined up on the row direction. The A and B image signals are processed as signals for phase difference detection.

That is, the CPU 102 or the image processing unit 105 performs correlation calculation of the A and B image signals, detects a phase difference between the A and B image signals, and calculates a subject distance based on the phase difference. That is, the CPU 102 or the image processing unit 105 functions as a distance information acquisition unit that acquires distance information indicating a distance to a subject.

By adding signals of the two photodiodes A and B of each pixel, it is possible to acquire signals for images (the A image signal+the B image signal). The added signals for the images are processed as image signals of color in accordance with the Bayer array illustrated in FIG. 2A by the image processing unit 105.

The imaging unit 107 can output a signal for phase difference detection (A and B image signals) for each pixel and can also output values obtained by adding and averaging a plurality of adjacent A image signals and adding and averaging a plurality of adjacent B image signals. By outputting the added and averaged values, it is possible to shorten a time in which signals are read from the imaging unit 107 or reduce a bandwidth of the internal bus 101.

The CPU 102 or the image processing unit 105 performs correlation calculation of two image signals using signals output from the imaging unit 107 included in the image sensor and calculates information such as a defocus amount, disparity information, or various reliabilities based on a phase difference between the two image signals.

A defocus amount on the light reception surface is calculated based on a deviation (a phase difference) between the A and B image signals. The defocus amount has a positive or negative value. A front focal point or a rear focal point can be understood according to whether the defocus amount is a positive or negative value.

According to an absolute value of the defocus amount, the degree of focus can be understood. When the defocus amount is 0, a focus is achieved. That is, the CPU 102 calculates information indicating a front focal point or a rear focal point based on the positive or negative defocus amount and calculates focus degree information which is the degree of focus (a focus deviation amount) based on the absolute value of the defocus amount.

The information indicating the front focal point or the rear focal point is output when the defocus amount exceeds a predetermined value. When the absolute value of the defocus amount is within the predetermined value, information indicating that a focus is achieved is output.

The CPU 102 controls the lens unit 106 in accordance with the defocus amount such that focus adjustment is performed.

The CPU 102 calculates a distance to a subject using the principle of triangulation from the phase difference information and lens information of the lens unit 106.

In FIGS. 2A and 2B, the example in which the pixels where two photodiodes serving as the photoelectric conversion units are arranged in one micro lens are arrange din an array form has been described. However, each pixel in which three or more photodiodes serving as the photoelectric conversion units are arranged for each micro lens may be configured. All the pixels may not have the foregoing configuration. For example, pixels for distance detection may be discretely arranged within a plurality of pixels for image detection arranged in a 2-dimensional form.

In this case, the pixel for distance detection may have a structure in which two photodiodes are included, as described above, or may have a structure in which each pixel for distance detection includes only the photodiodes A and B.

When only one of the photodiodes A and B is included, the photodiodes A and B are arranged so that images of different pupil regions (exit pupils) of the lens units are incident. Alternatively, one of the light fluxes is blocked.

In this way, the imaging unit 107 according to the present embodiment may have a configuration in which two image signals with which the phase difference between the A and B image signals or the like can be detected are obtained, and the present embodiment is not limited to the foregoing pixel structure. The imaging unit 107 may be a so-called stereo camera including two image sensors that has disparity.

Figure 3:
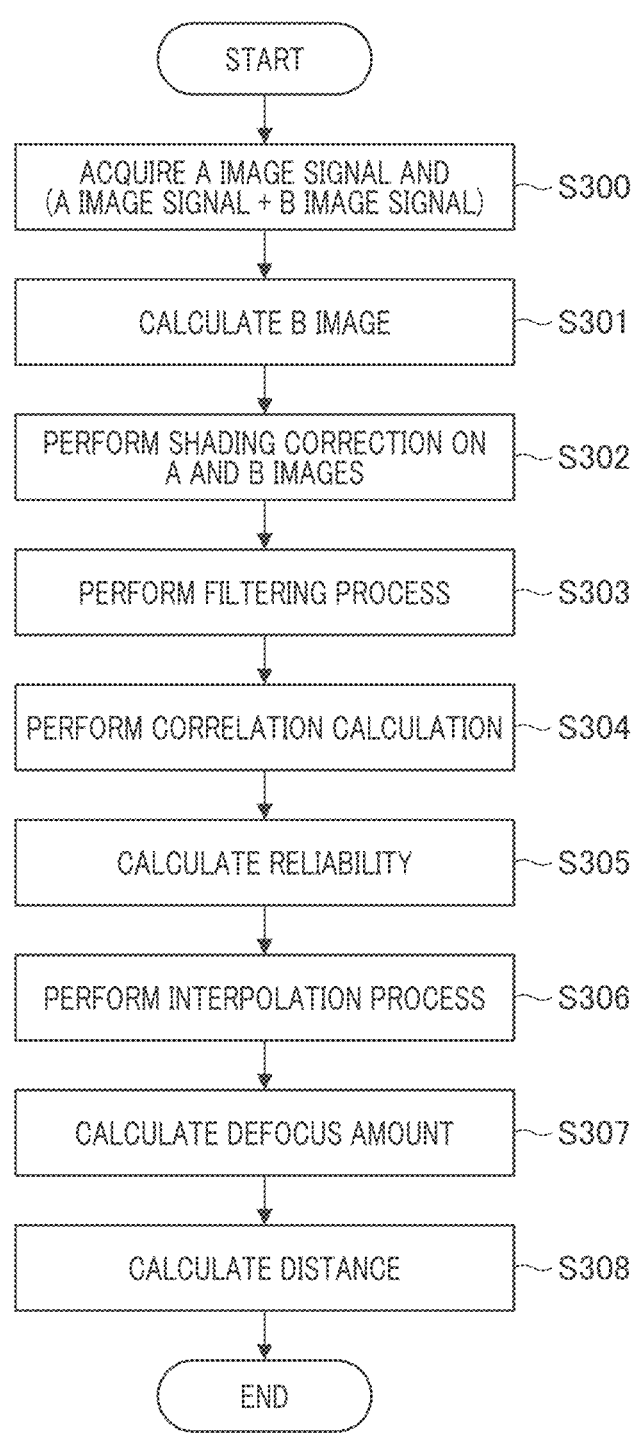
FIG. 3 is a flowchart illustrating a process of generating distance information according to the first embodiment.

Next, a process of generating the distance information will be described with reference to FIGS. 3 to 5. FIG. 3 is a flowchart illustrating a process of generating distance information according to the first embodiment.

The CPU 102 serving as a computer executes a computer program stored in the ROM 103 serving as a storage medium to perform an operation of each step of the flowchart of FIG. 3.

In the flowchart of FIG. 3, first, two signals of the A image signal for phase difference detection and the (A and B image signal) for imaging are each read and acquired from the imaging unit 107 in step S300.

Subsequently, in step S301, the image processing unit 105 calculates the B image signal for phase difference detection by obtaining a difference between the A image signal and the (the A image signal and the B image signal).

The example in which the B signal is calculated by reading the A image signal and the (the A image signal+the B image signal) and calculating the A image signal in the foregoing steps S300 and S301 has been described. However, the A and B image signals may be each read from the imaging unit 107.

When two image sensors such as stereo cameras are included, image signals output from the image sensors may be set as the A and B image signals to be processed.

In step S302, optical shading correction is performed on each of the A image signal for phase difference detection and the B image signal for phase difference detection.

In step S303, a filtering process is performed on each of the A image signal for phase difference detection and the B image signal for phase difference detection. For example, a lowpass is cut by a highpass filter configured with an FIR. Each signal may pass through a bandpass filter or a lowpass filter in which a filter coefficient is changed.

Subsequently, in step S304, the A image signal for phase difference detection and the B image signal for phase difference detection subjected to the filtering process in step S303 are divided into minute blocks and correlation calculation is performed. There is no limitation on sizes or shapes of the minute blocks and regions may superimposed between adjacent blocks.

Hereinafter, correlation calculation on the A and B image signals which are a pair of images will be described. A signal row of the A image signal at pixel positions of interest is written as E(1) to E(m) and a signal row of the B image signal at pixel positions of interest is written as F(1) to F(m).

A correlation amount C(k) in a shift amount k between two signal rows is calculated using Expression (1) while relatively shifting the signal row F(1) to F(m) of the B image signal from the signal row E(1) to E(m) of the A image signal.

$$C(k) = \sum |E(n) - F(n+k)| \tag{1}$$

Expression (1), $\Sigma$ calculation means calculation in which a total sum is calculated for n. In the $\Sigma$ calculation, a range between n and n+K is restricted to a range between 1 to m. The shift amount k is an integer value and a relative shift amount which is measured using detection pitches of a pair of pieces of data as units.

Figure 4:
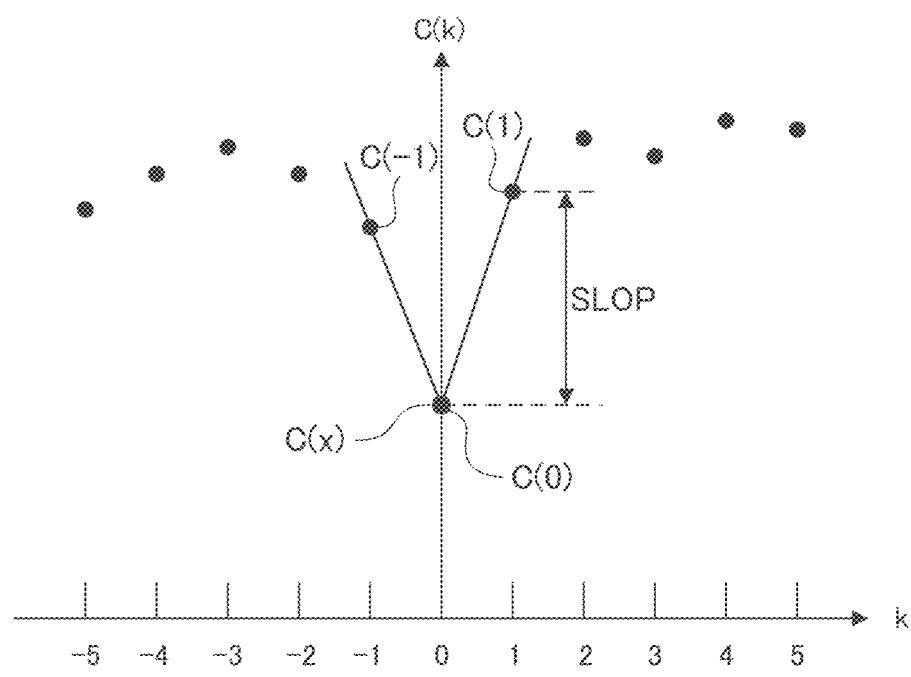
FIG. 4 is a diagram illustrating a calculation result of Expression (1) when correlation between a pair of image signal rows is high in an ideal state in which there is no noise.

FIG. 4 is a diagram illustrating a calculation result of Expression (1) when correlation between a pair of image signal rows is high in an ideal state in which there is no noise.

As illustrated in FIG. 4, the correlation amount C(k) which is a difference becomes the minimum at a shift amount (where k=kj=0) at which correlation between a pair of image signal rows is high. Hereinafter, k when an ideal correlation amount C(k) is the minimum is written as kj. Through a 3-point interpolation process expressed in Expressions (2) to (4), a shift amount x at which a minimum value C(x) is given for continuous correlation amounts is calculated. The shift amount x is a real-number value and a unit is a pixel.

$$x = kj + \frac{D}{SLOP} \tag{2}$$

$$D = \frac{\{C(kj-1) - C(kj+1)\}}{2} \tag{3}$$

$$SLOP = \text{MAX}\{C(kj+1) - C(kj), C(kj-1) - C(kj)\} \tag{4}$$

In Expression (4), SLOP indicates a slope of a change in a minimum or maximum correlation amount or an adjacent correlation amount. In FIG. 4, the following is set as a specific example.

$$C(kj) - C(0) = 1000$$

$$C(kj-1) = C(-1) = 1700$$

$$C(kj+1) = C(1) = 1830$$

In this example, kj=0 is set. From Expressions (2) to (4), the following is obtained.

$$SLOP = 830$$

$$x = -0.078 \text{ pixels}$$

In the case of a focus state, an ideal value of the shift amount of the signal row of the A image to the signal row of the B image is 0.00.

Figure 5:
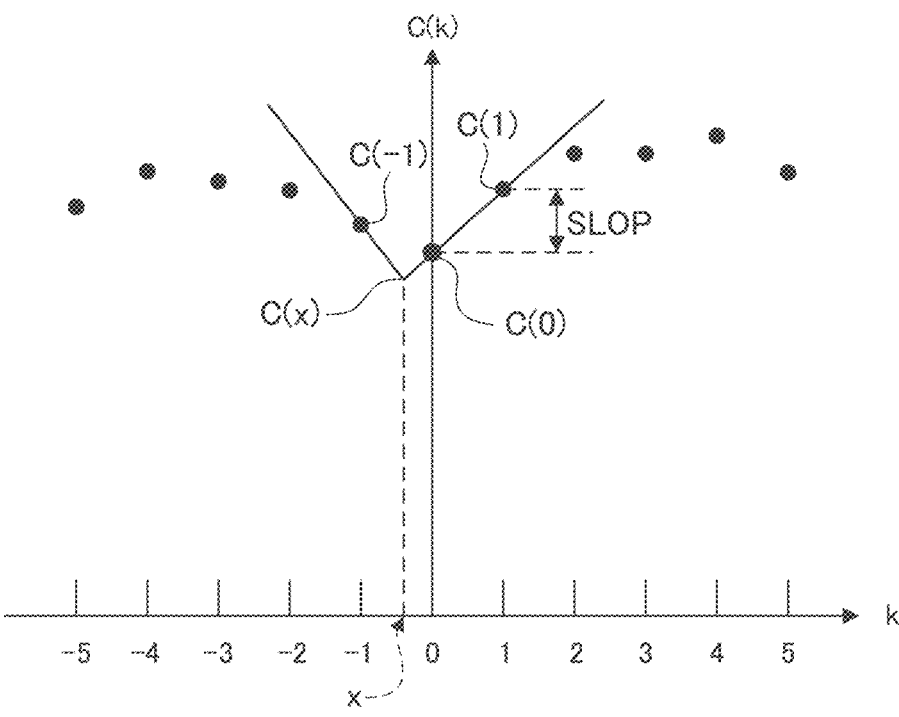
FIG. 5 is a diagram illustrating a calculation result when Expression (1) is applied to a minute block in which there is noise.

On the other hand, FIG. 5 is a diagram illustrating a calculation result when Expression (1) is applied to a minute block in which there is noise.

As illustrated in FIG. 5, an influence of noise distributed at random deteriorates correlation between the signal row of the A image and the signal row of the B image. A minimum value of the correlation amount C(k) is larger than a minimum value illustrated in FIG. 4. A curve of the correlation amount has an overall flat shape (a shape in which a difference absolute value between maximum and minimum values is small).

In FIG. 5, the following is set as a specific example.

$$C(kj) - C(0) = 1300$$

$$C(kj - 1) = C(-1) = 1480$$

$$C(kj + 1) = C(1) = 1800$$

In tis example, kj=0 is set. From Expressions (2) to (4), the following is obtained.

$$SLOP = 500$$

$$x = -0.32 \text{ pixels}$$

That is, compared to the calculation result in the state in which there is no noise, as illustrated in FIG. 4, the shift amount x is separated from the ideal value.

When the correlation between a pair of image signal systems is low, a change amount of the correlation amount C(k) increases and the curve of the correlation amount has an overall flat shape. Therefore, the value of SLOP increases. Even when a subject image has low contrast, the curve of the correlation amount is formed in a flat shape.

Based on this property, the reliability of the calculated shift amount x can be determined with the value of SLOP. That is, when the value of SLOP is large, it can be determined that the correlation between the pair of image signal systems is high. When the value of SLOP is small, it can be determined that meaningful correlation between the pair of image signal systems is not obtained.

In the present embodiment, since Expression (1) is used for the correlation calculation, the correlation amount C(k) in a shift amount at which the correlation between the pair of image signal systems is the highest becomes the minimum or maximum. However, a correlation calculation method of maximizing or minimizing the correlation amount C(k) at the shift amount at which the correlation between the pair of image signal systems is the highest may be used.

Subsequently, reliability is calculated in step S305. As described above, the value of SLOP calculated in step S304 as described above is defined as the reliability.

Subsequently, an interpolation process is performed in step S306. The correlation calculation has been performed in step S304. However, since the reliability calculated in step S305 is low, the reliability cannot be adopted as the shift amount in some cases.

In this case, interpolation is performed from the shift amount calculated with neighboring pixels. As the interpolation method, a median filter may be applied or calculation for contracting data of the shift amount and then expanding the data of the shift amount again may be performed. Color data may be extracted from the (A image signal+B image signal) for imaging and the shift amount may be interpolated using the color data.

Subsequently, in step S307, a defocus amount is calculated with reference to the shift amount x calculated in step S304. Specifically, a defocus amount (written as DEF) can be obtained with the following Expression (5).

$$DEF = P \cdot x \tag{5}$$

In Expression (5) P is a conversion coefficient determined in accordance with a distance between a detection pitch (a pixel arrangement pitch) and a projection center between two right and left viewpoints in a pair of disparity images and a unit is a min/pixel unit.

Subsequently, in step S308, a distance is calculated from the defocus amount calculated in step S307. When Da is a distance to a subject, Db is a focal position, and F is a focal distance, the following Expression (6) holds approximately.

$$\frac{1}{Db} - \frac{1}{Da} = \frac{1}{F} \tag{6}$$

Accordingly, a distance Da to a subject is expressed in Expression (7).

$$Da = \frac{Db \cdot F}{F - Db} \tag{7}$$

Accordingly, when Db0 is Db at the time of DEF=0, Expression (7) becomes Expression (8).

$$Da' = \frac{(Db0 - DEF) \cdot F}{F - (Db0 - DEF)} \tag{8}$$

Thus, an absolute distance to a subject can be obtained.

On the other hand, since a relative distance is Da-Da', the following Expression (9) can be obtained from Expressions (7) and (8).

$$Da - Da' = \frac{DEF \cdot F^2}{(F - Db0)^2 + DBF \cdot (F - Db0)} \tag{9}$$

As described above, when the correlation calculation is performed in accordance with the flowchart of FIG. 3, the distance information such as the distance data, the shift amount, and the defocus amount, can be calculated from the A image signal for phase difference detection and the B image signal for phase difference detection. That is, the distance information can be acquired based on a phase difference between outputs of the plurality of photoelectric conversion units. The distance information according to the present embodiment may be the distance data itself or may be the shift amount or the defocus amount. The distance information includes them.

In the present embodiment, the distance information calculated as described above and the auxiliary data or the like related to the distance information are superimposed to generate a data stream, and the data stream is output via the image output unit 109 serving as an output unit. Accordingly, combination or the like of highly accurate computer graphics (CG) images can be performed efficiently and accurately by an external device. Details of the auxiliary data will be described below.

Hereinafter, an example of a method of outputting the distance information and the auxiliary data related to the distance information to the outside in conformity with a transmission standard of an SDI will be described. Since there is a forbidden code in the transmission standard of the SDI, a part of the distance information is converted to be superimposed so that the forbidden code does not arise.

First, a structure of an HD-SDI data stream when a frame rate is 29.97 fps, a horizontal resolution is 1920, and a vertical resolution is 1080 will be described with reference to FIG. 6. The HD-SDI data stream is defined in SMPT-EST292-1.

Figure 6:
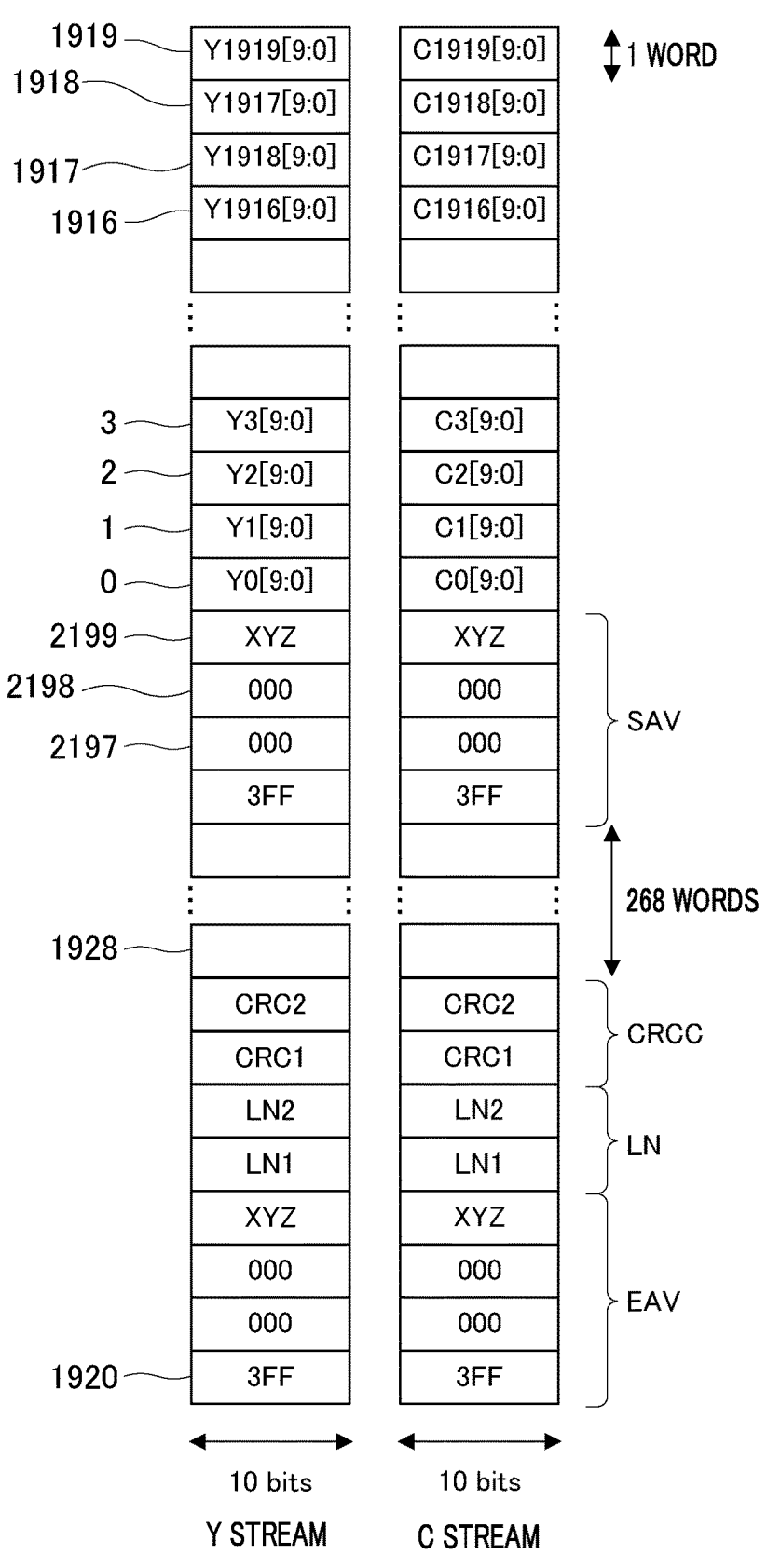
FIG. 6 is a diagram illustrating an SDI structure according to the first embodiment.

FIG. 6 is a diagram illustrating an SDI structure according to the first embodiment. A one-line data stream is divided into two data streams in which 1 word has 10 bits, as illustrated. In one frame, the data stream has 1125 lines. A Y (luminance) stream and a C (color) stream include 2200 words in which 1 word has 10 bits.

In data, an identifier end of active video (EAV) for identifying a separation position of an image signal is superimposed from the 1920-th word, and a line number (LN) and a cyclic redundancy check code (CRCC) which is data for a transmission error checking are continuously superimposed.

Ancillary data (auxiliary data) is superimposed, correct data regions (hereinafter referred to as a blanking region) corresponding to 268 words continue. Thereafter, an identifier start of active video (SAV) for recognizing a separation position of an image signal is superimposed as in the EAV.

Then, Y data (luminance data) and C data (color data) corresponding to 1920 words are superimposed to be transmitted. When a frame rate is changed, the number of words of one line is changed. Therefore, the number of words in the blanking region are changed.

Next, a process of superimposing the distance information according to the present embodiment will be described with reference to FIG. 7.

FIG. 7 is a diagram illustrating a superimposition example of distance information according to the first embodiment. At superimposition positions of the Y data and the C data in FIG. 6, it is indicated how the distance information is superimposed for each word.

FIG. 7 illustrates an example of a case in which highly accurate distance information that has a total sum of 18 bits from D[17] to D[9] serving as distance information superimposed on the Y data to D[8] to D[0] serving as distance information superimposed on the C data is calculated for each pixel in step S308 of FIG. 3. The distance information is divided and superimposed on the plurality of data streams.

In the transmission standard of the SDI, 0, 1, 2, and 3 and 1020, 1021, 1022, and 1023 serve as forbidden codes. Accordingly, as in FIG. 7, ~D[17] which is a value obtained by inverting D[17] is superimposed at the position of Y[9] and values of D[17] to D[9] are superimposed at the positions of Y[8] to Y[0].

~D[8] which is a value obtained by inverting D[8] is superimposed at the position of C[9] and values of D[8] to D[0] are superimposed at the positions of C[8] to C[0], and thus the distance information is converted and superimposed so that the forbidden codes do not arise.

here, the example of the case in which the distance information is 18-bit highly accurate distance information has been described, but a bit depth of the distance information may have 18 bits or less. Even in this case, similarly, a value obtained by inverting a value superimposed at the position of Y[8] is used as a value superimposed at the position of Y[9] and a value obtained by inverting a value superimposed at the position of C[8] is used as a value superimposed at the position of C[9]. Thus, the distance information can be superimposed do that the forbidden codes do not arise.

As described above, in the present embodiment, various kinds of auxiliary data are incidental as metadata to the distance information to be output. For example, when an external device performs postprocessing such as CG image combination, it is preferable to acquire, for example, various kinds of setting data and data regarding a state of the image processing device as auxiliary data (ancillary data) in order to uses the distance information accurately.

Here, various kinds of setting data of the image processing device include, for example, exposure setting information. The data regarding the state of the image processing device includes, for example, data such as a slope.

Further, the auxiliary data preferably includes lens information (for example, at least one of a focal distance, a focus position, and diaphragm information of the lens unit 106) related to the lens unit 106.

Further, the auxiliary data preferably includes data for synchronizing a captured image with the distance information (for example, a timecode) and information indicating presence or absence of various correction processes performed before the distance information is calculated.

It is preferable to also include data indicating an attribute of the distance information. Here, the attribute of the distance information includes, for example, information indicating whether the distance information is data itself, defocus information, or shift amount data.

When the defocus information is output as the distance information, information regarding a focal distance of the lens unit is necessary as auxiliary data in order to calculate a subject distance from the defocus amount. When the shift amount is output as the distance information, information regarding the shift amount k is also necessary as auxiliary data.

The attribute information of the distance information includes the number of effective bits (a bit depth) of the distance information, information indicating whether the distance information is an absolute distance or a relative distance, and information indicating which bit is a decimal point or less when the distance information has the decimal point.

The attribute of the distance information includes information indicating whether the distance information is signed when the distance information is a relative distance, information indicating which cm 1LSB of the distance information is, and a distance of a focus position when a signed expression is not made in the relative distance.

The auxiliary data preferably includes values of a nearest distance (a distance to a nearest subject) and a farthest distance (a distance to a farthest subject) and information such as a measurable resolution.

Further, when the foregoing image, distance information, or auxiliary data are superimposed as auxiliary data to be output from the image processing device 100, it is necessary to include information regarding a data structure (a data format) of the superimposed data stream.

As the superimposition according to the present embodiment, multiplexing (for example, insertion into a gap such as a blanking period) may be performed or data may be mutually mixed and coded. The superimposition according to the present embodiment include either method.

The data stream according to the present embodiment is not limited to the data stream such as a moving-image data formed by a plurality of frames. For example, still-image data of only one frame is also included.

Therefore, in the present embodiment, as described above, when the distance information is output, the above-described various kinds of information (hereinafter referred to as auxiliary data or ancillary data) is ancillary to be output in addition to the distance information. Accordingly, it is possible to improve accuracy or efficiency of the postprocessing such as image combination.

According to the present embodiment, various kinds of auxiliary data are packaged and superimposed on a blanking region to be output along with the distance information, transmission is efficient.

Figure 8:
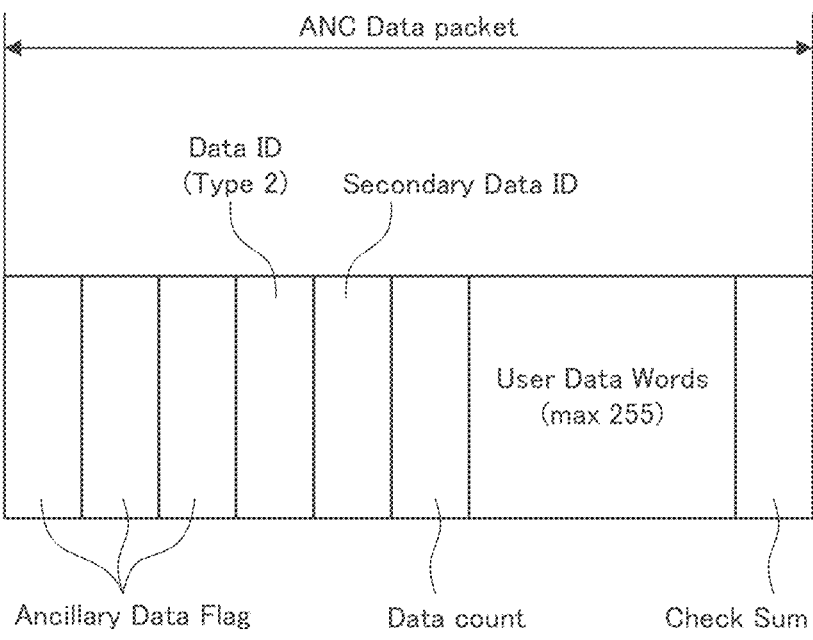
FIG. 8 is a diagram illustrating a packet structure of ancillary data superimposed on a blanking region according to the first embodiment.

FIG. 8 is a diagram illustrating a packet structure of ancillary data superimposed on a blanking region according to the first embodiment. A packet structure for storing an auxiliary data (ancillary data) defined in SMPTE ST 291 is illustrated.

The auxiliary data (ancillary data) is stored in user data words (User Words) that each have 10 bits in the ancillary data packet (ANC packet) of Type 2 illustrated in FIG. 8. The stored data format may be any format as long as information can be acquired as a value.

The above-described data is stored in the user data words. In a data ID (DID) and a secondary ID (SDID) which is a header region for identifying a type of an ancillary data packet, a predetermined value indicating information regarding data which is being transmitted is set for each packet.

In one ancillary data packet, user data words of a maximum of 255 words can be stored. However, the above-described auxiliary data is divided and superimposed in a plurality of ancillary data packets to be output without storing up to 255 words.

Figure 9:
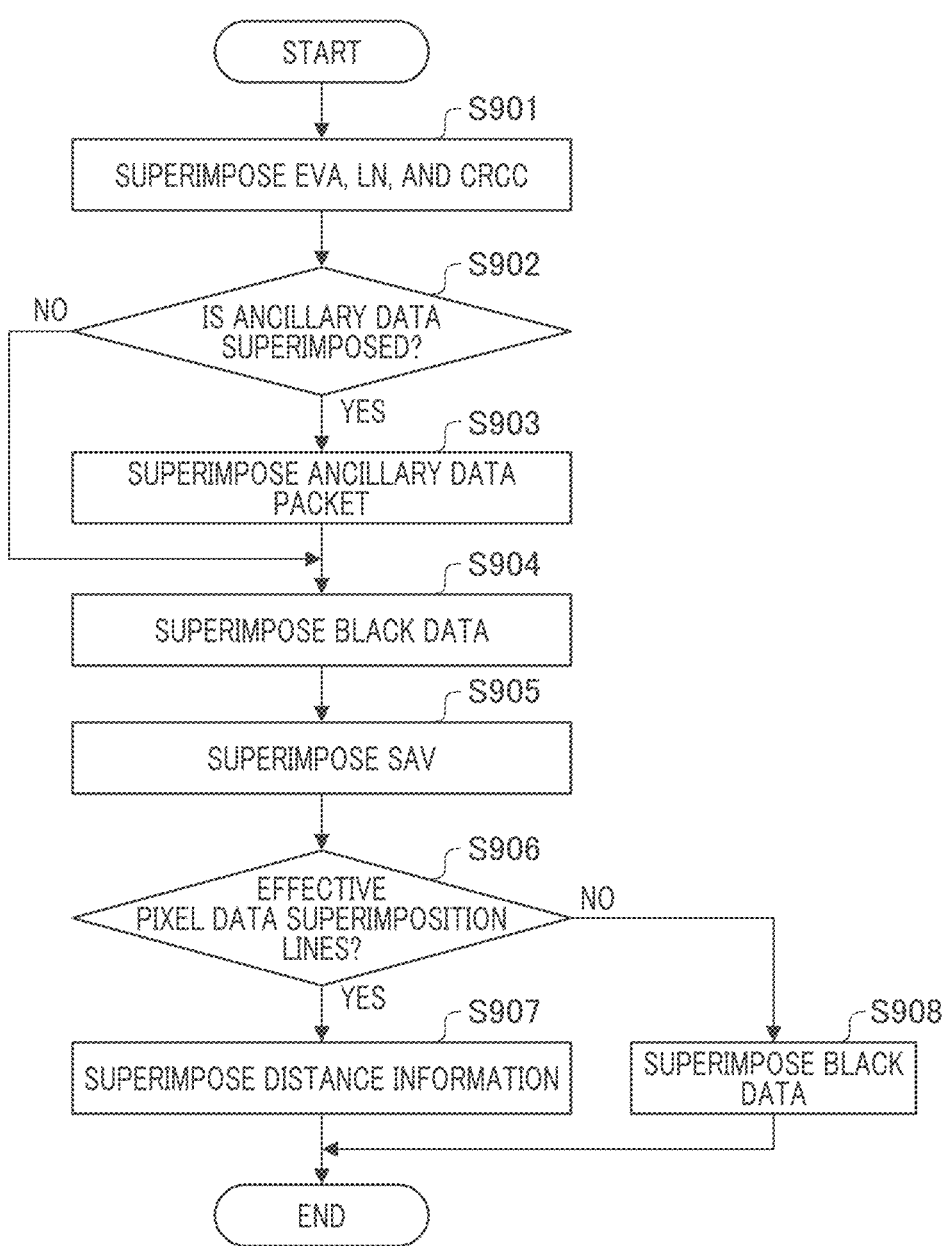
FIG. 9 is a flowchart illustrating a stream generation process according to the first embodiment.

FIG. 9 is a flowchart illustrating a stream generation process according to the first embodiment. Next, a stream generation process according to the first embodiment will be described with reference to FIG. 9. The CPU 102 serving as a computer loads and executes a computer program stored on the ROM 103 or the like serving as a storage medium on the RAM 104 to perform an operation of each step of the flowchart of FIG. 9.

In FIG. 9, in step S901, the CPU 102 generates and superimposes EAV, LN, and CRCC in accordance with SMPTE ST 292-1. In step S902, the CPU 102 determines whether to superimpose the ancillary data packet stored in the above-described each piece of auxiliary data (ancillary data).

Since the superimposition position of each ancillary data packet is different, a predetermined ancillary data packet is superimposed in a predetermined line and a predetermined sample timing in step S903. Here, step S903 serves as an auxiliary data generation step (an auxiliary data generation unit) of generating auxiliary data related to the distance information.

In step S904, data indicating a black level of the image signal is superimposed in a blanking region in which the ancillary data packet is not superimposed. The data indicating the black level is, for example, data in which the number of pieces of Y data is 64 and the number of pieces of C data is 512. In step S905, the CPU 102 generates and superimposes SAV in accordance with SMPTE ST 292-1.

In step S906, the CPU 102 determines whether lines are effective pixel data superimposition lines. For example, for a progressive image, the 42nd line is a start line of effective pixel data superimposition lines and the effective pixel data superimposition lines continue until the 1121st line.

For an interlaced image, effective pixel data superimposition lines of a first field are lines from the 21st line to the 560th line, and effective pixel data superimposition lines of a second field are lines from the 584th line to the 1123rd line. When the lines are the effective pixel data superimposition lines, the process proceeds to step S907. Conversely, when the lines are not the effective pixel data superimposition lines, the CPU 102 causes the process to proceed to step S908.

In step S907, the distance information or the like is superimposed, as described with reference to FIG. 7. In step S908, the black data is superimposed as in step S904. The above-described process is performed for each line. Further, a step of serializing and outputting the data so that SMPTE ST 292-1 is defined is performed.

Accordingly, the image processing device 100 can superimpose and output the image, the distance information, and the auxiliary data to the outside via the image output unit 109. Here, steps S1301 to S1308 serve as a data stream generation step (a data stream generation unit) of generating the data stream in which the image, the distance information, and the auxiliary data are superimposed.

In the present embodiment, the example in which the distance information itself is output has been described. However, for example, the shift amount may be output rather than the distance information itself, and information indicating that information which is being output is not the distance information but the shift amount and information necessary to calculate the distance information from the shift amount may be output as auxiliary data. In this way, it is possible to calculate the distance information through the postprocessing.

Second Embodiment

In the first embodiment, the image combination can be performed through the postprocessing by outputting the distance information and the auxiliary data necessary for the image combination or the like, but the combined image is not displayed as an image for which a person can easily recognize the distance information even if the output is connected to an external display. Accordingly, in a second embodiment, an example in which an external display is connected and distance information is output so that a user can easily confirm an acquisition status of the distance information will be described.

Figure 10:
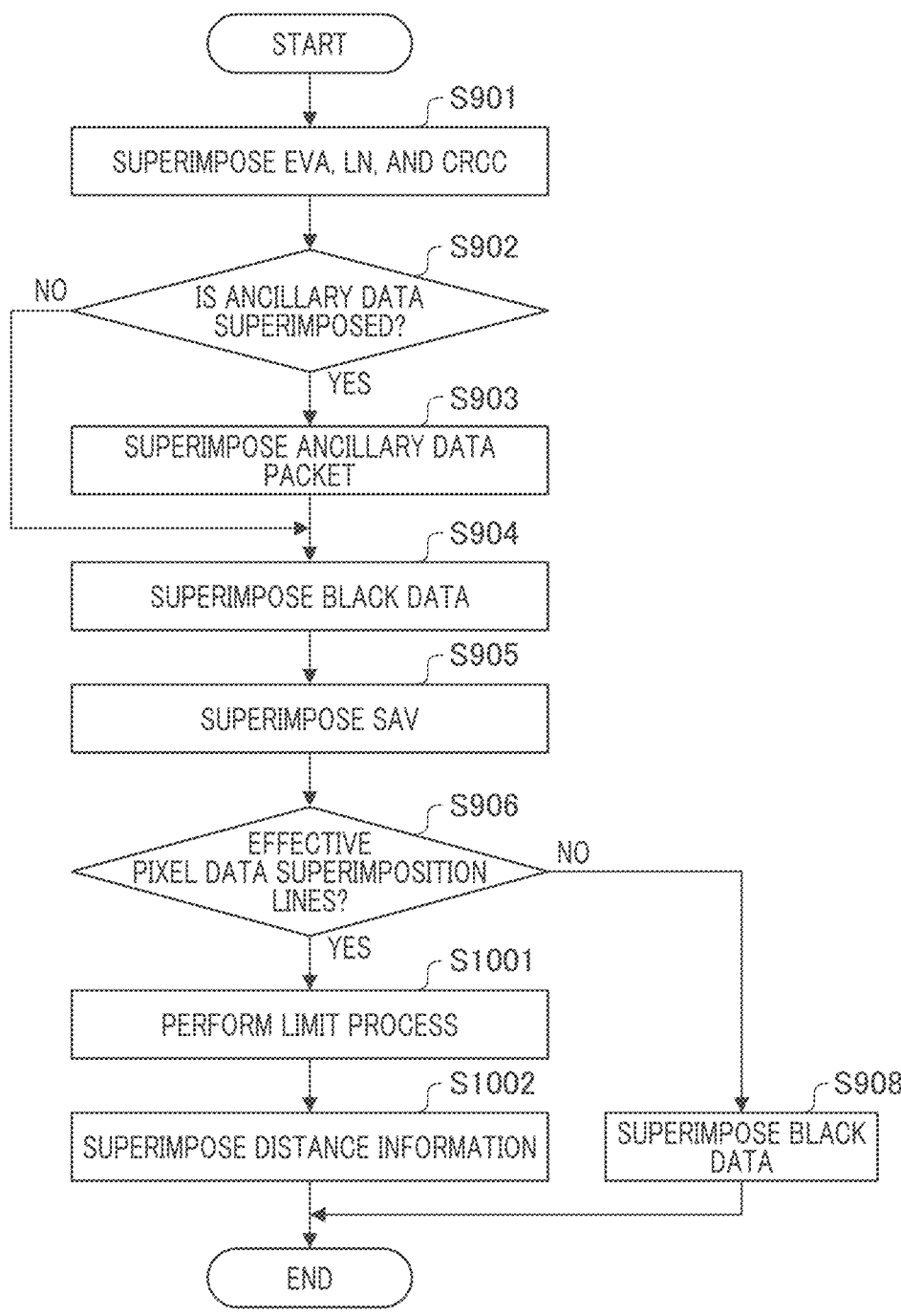
FIG. 10 is a flowchart illustrating a processing example in which distance information is output so that the distance information is easily viewed on a display according to a second embodiment.

FIG. 10 is a flowchart illustrating a processing example in which distance information is output so that the distance information is easily viewed on a display according to the second embodiment. Each process in the flowchart is implemented by causing the CPU 102 to load and execute a program stored in the ROM 103 on the RAM 104.

In the present embodiment, the same reference numerals are given to the same or similar configurations and steps as those of the first embodiment and repeated description will be omitted.

In step S1001, the CPU 102 performs a limit process on the high-order 10 bits of the distance information calculated in step S308 of FIG. 3 for the conversion so that the forbidden codes do not arise. Specifically, when the high-order 10 bits of the distance information are 0, 1, 2, and 3, 4 is set. When the high-order 10 bits are 1023, 1022, 1021, and 1020, 1019 is set.

In step S1002, at the superimposition positions of the Y data in FIG. 6, the CPU 102 superimposes the high-order 10 bits (D'[9] to D'[0]) of the distance information subjected to the limit process for each word as in FIG. 11. FIG. 11 is a diagram illustrating a superimposition example of distance information according to the second embodiment.

On the other hand, at the superimposition position of the C data, a fixed value such as 1 is superimposed at, for example, the position of C[9] which is the most significant bit and a fixed value such as 0 is superimposed at the position of C[0] from C[8] otherwise.

Figure 12:
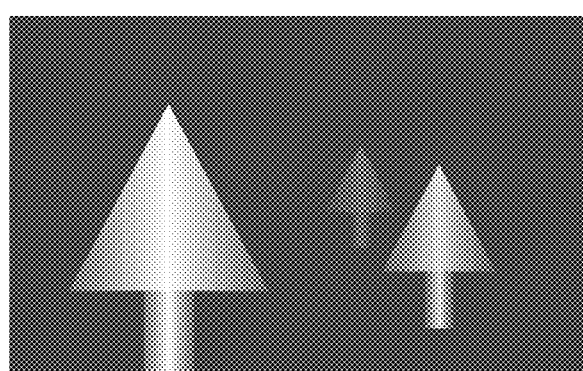
FIG. 12 is a diagram illustrating a display example of the distance information according to the second embodiment.

By performing the foregoing process and causing the image processing device 100 to output the distance information via the image output unit 109 in conformity with the definition of SMPTE ST 292-1, it is possible to display the distance information in grayscale as in FIG. 12 on a display capable of receiving HD-SDI. FIG. 12 is a diagram illustrating a display example of the distance information according to the second embodiment.

In the example illustrated in FIG. 12, the closer a distance is, the higher luminance of a subject is. The farther the distance is, the lower the luminance of the subject is. Since the distance information is expressed in intensity of luminance in this way, the user can easily view an acquisition status of the distance information.

Figure 13:
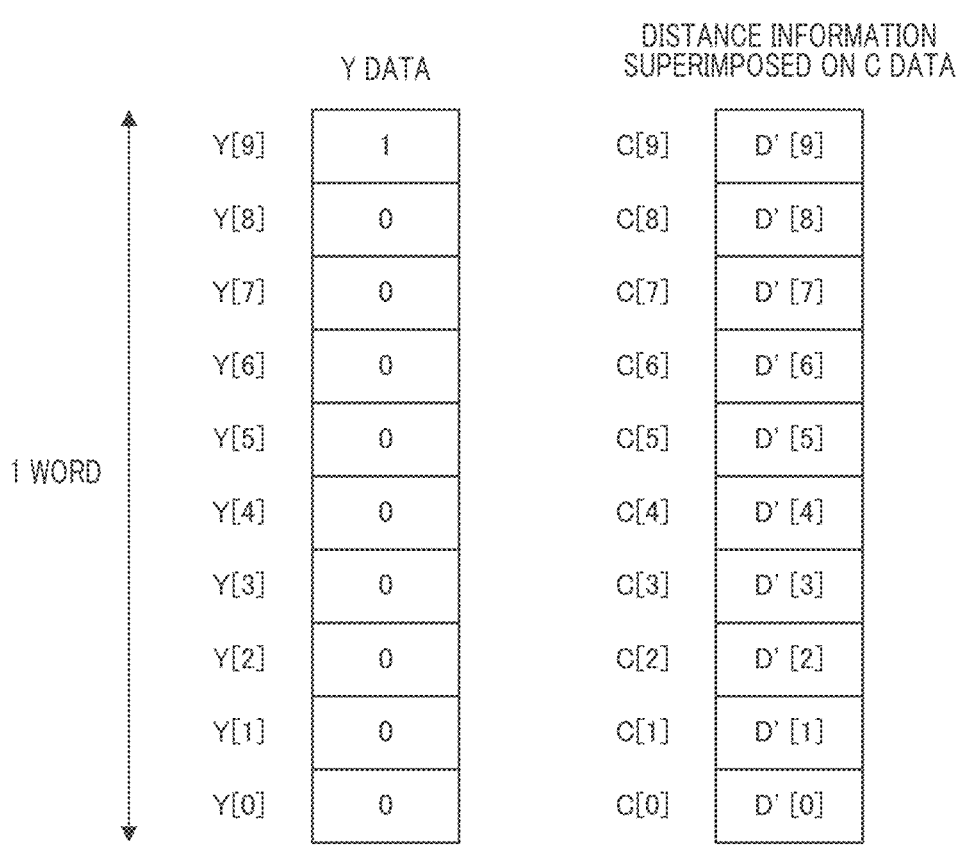
FIG. 13 is a diagram illustrating another display example of the distance information according to the second embodiment.

In the present embodiment, the example in which the distance information is superimposed at the positions of the Y data has been described. However, in step S1002, as in FIG. 13, the distance information may be superimposed at the positions of the C data and the fixed values may be superimposed at the positions of the Y data. FIG. 13 is a diagram illustrating another display example of the distance information according to the second embodiment.

When the distance information is superimposed at the positions of the C data, as in FIG. 13, the distance information can be displayed at the intensity of color such as a heatmap on an external display.

Here, when an image format for transmission is YCbCr422, a format in which Cb and Cr are alternately superimposed on the C data for each word is set. Accordingly, for example, a horizontal resolution of the distance information is halved by superimposing a fixed value in Cb and superposing the distance information in only Cr. However, a reddish gradation of the distance information may be displayed on an external display.

Conversely, by superimposing a fixed value in Cr and superimposing the distance information in only Cb, a blueish gradation of the distance information may be displayed on the external display.

Alternatively, when a predetermined threshold is provided and the distance information exceeds the threshold, the distance information may be superimposed in Cb and the fixed value may be superimposed in Cr. When the distance information is less than the threshold, the distance information may be superimposed in Cr and the fixed value may be superimposed in Cb.

Conversely, when the distance information exceeds the threshold, the distance information may be superimposed in Cr and the fixed value may be superimposed in Cb. When the distance information is less than the threshold, the distance information may be superimposed in Cb and the fixed value may be superimposed in Cr.

Alternatively, the distance information may be superimposed at the positions of both the Y data and the C data. In this case, both luminance and color changed in accordance with a value of the distance information are displayed on an external display.

Third Embodiment

In the first and second embodiments, the methods of superimposing the distance information at the positions at which the image signals are superimposed in the related art and transmitting the distance information have been described. However, in these cases, it is necessary to prepare an output terminal separately from a terminal that outputs the distance information. Accordingly, in a third embodiment, an example in which an image signal, distance information, and auxiliary data are output with an output terminal of one system will be described.

Figure 14:
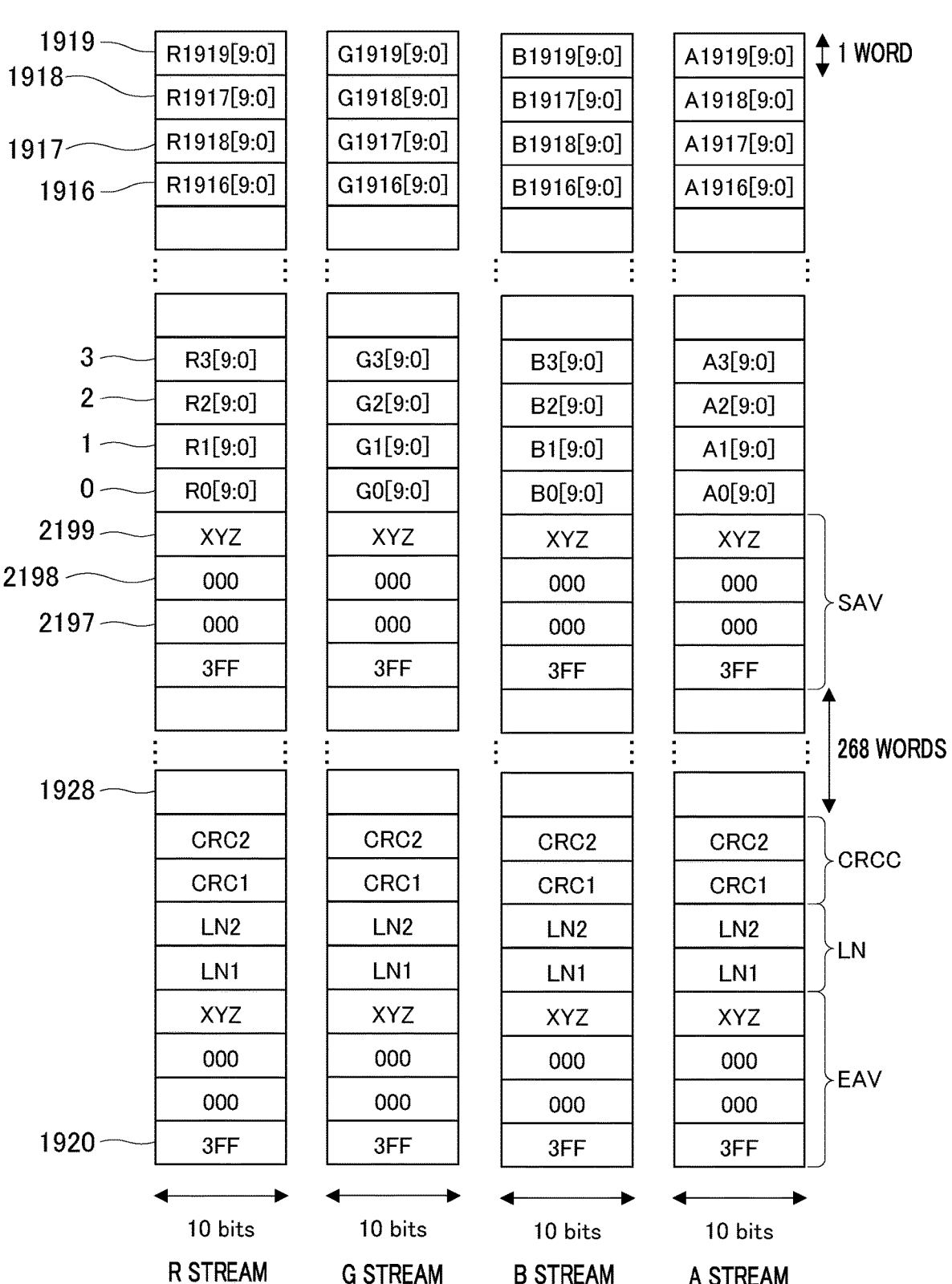
FIG. 14 is a diagram illustrating an SDI structure according to a third embodiment.

FIG. 14 is a diagram illustrating an SDI structure according to a third embodiment. A structure of a data stream of 3G-SDI when a frame rate is 29.97 fps, a horizontal resolution is 1920, and a vertical resolution is 1080 will be described with reference to FIG. 14. The data stream of 3G-SDI is defined in SMPTE ST 425-1.

As illustrated FIG. 14, a one-line data stream is divided into four data streams in which 1 word has 10 bits. In one frame, the data stream has 1125 lines. An R stream, a G stream, a B stream, and an A stream include 2200 words in which 1 word has 10 bits.

The A stream corresponds to a data stream of an alpha channel. In the present embodiment, the distance information is superimposed on the A stream which is a data stream of the alpha channel.

In data, an EAV is superimposed from the 1920-th word, and an LN and a CRCC are continuously superimposed. A blanking region corresponding to 268 words continue. Thereafter, an SAV is superimposed. R (red) data, G (green) data, B (blue) data, and A (distance information) data corresponding to 1920 words are superimposed to be transmitted. When a frame rate is changed, the number of words of one line is changed. Therefore, the number of words in the blanking region is changed.

Figure 15:
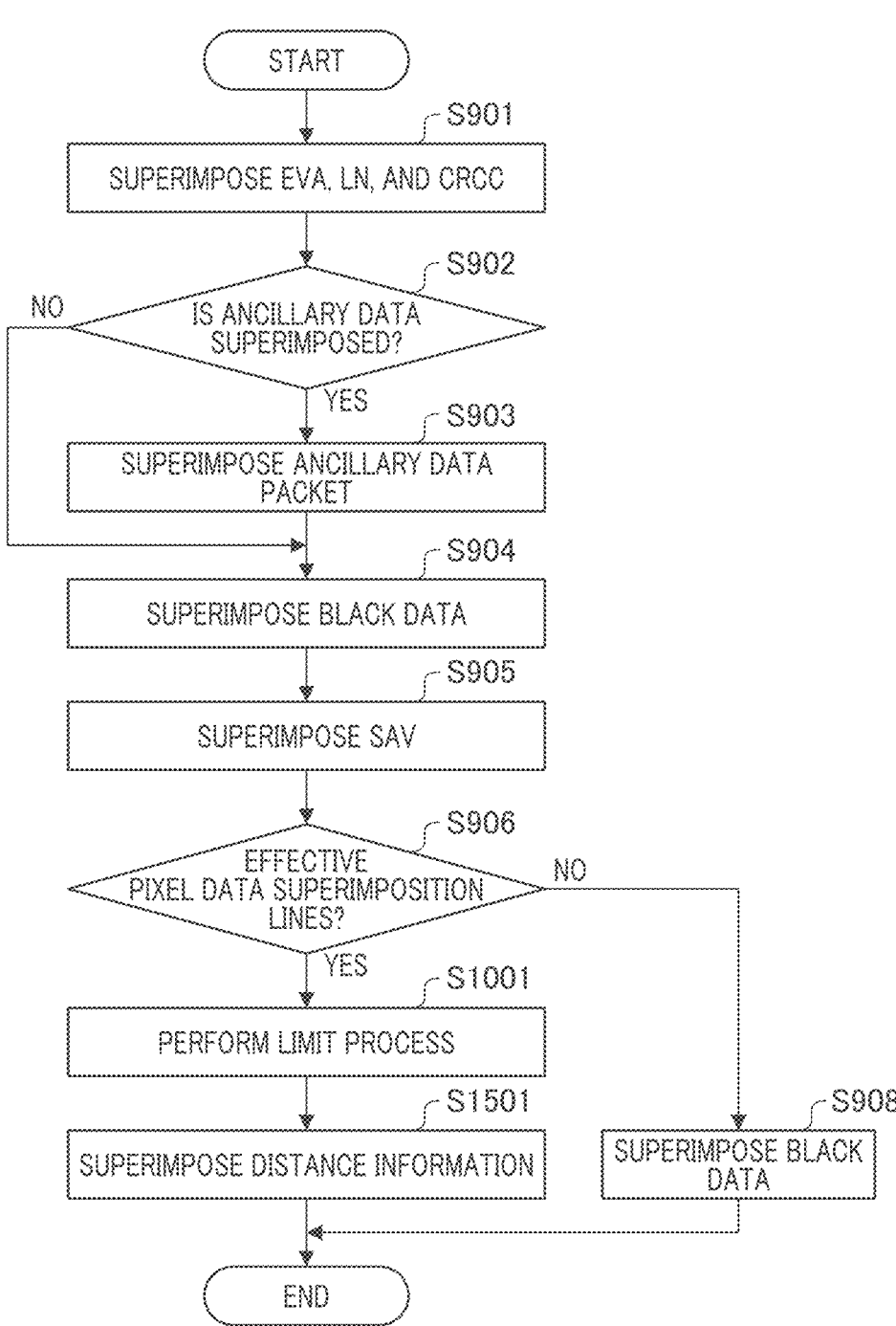
FIG. 15 is a flowchart illustrating a stream generation process according to the third embodiment.

FIG. 15 is a flowchart illustrating a stream generation process according to the third embodiment. FIG. 16 is a diagram illustrating a superimposition example of distance information according to the third embodiment.

A stream generation process according to the third embodiment will be described with reference to the flowchart of FIG. 15 and the superimposition example of FIG. 16. Each process in the flowchart is implemented by causing the CPU 102 to load and execute a program stored in the ROM 103 on the RAM 104. In the present embodiment, the same reference numerals are given to the same or similar configurations and steps as those of the second embodiment and repeated description will be omitted.

In step S1501, the CPU 102 superimposes the high-order 10 bits (D'[9] to D'[0]) of the distance information subjected to the limit process for each word as illustrated in FIG. 16 at the superimposition position of the A (distance information) data in FIG. 14. On the other hand, at the superimposition position of each piece of data of RGB, an image signal is superimposed as it is in the format of RGB.

By performing and outputting the above-described process in conformity with definition of SMPTE ST 425-1, it is possible to output the image signal, the distance information, and the auxiliary data with the output terminal of one system. In the present embodiment, the example in which the image signal is superimposed in the format of RGB has been described. However, the image signal may be superimposed in the format of YCbCR or the like rather than RGB and the distance information may be superimposed and output as the A data as in FIG. 16.

Fourth Embodiment

In the first and second embodiments, the examples of the methods of outputting the distance information have each been described. However, a user may select such methods and the image processing device 100 may be configured so that an output appropriate for a purpose of the user can be performed. Accordingly, in a fourth embodiment, an example in which the output method in each embodiment is switched for an output will be described.

Figure 17:
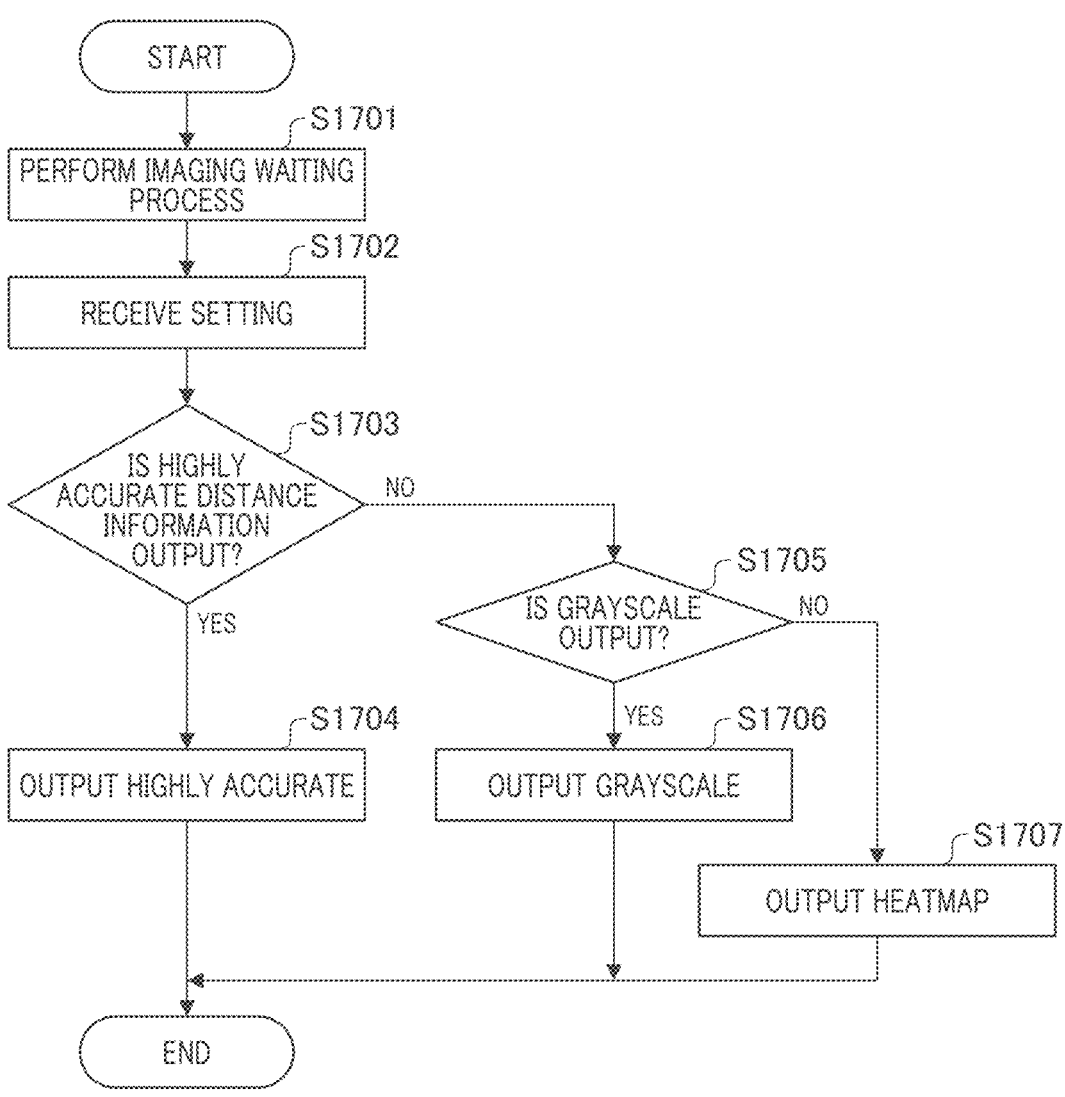
FIG. 17 is a flowchart illustrating an example of an output mode selection process of distance information according to a fourth embodiment.

FIG. 17 is a flowchart illustrating an example of an output mode selection process of distance information according to the fourth embodiment. Each process in the flowchart is implemented by causing the CPU 102 to load and execute a program stored in the ROM 103 on the RAM 104.

When the user operates the operational unit 113 to supply power to a power unit (not illustrated), the CPU 102 performs an imaging waiting process in step S1701. In the imaging waiting process, the CPU 102 causes the imaging unit 107 to perform imaging and displays an image obtained through image processing by the image processing unit 105 or a menu used to set the image processing device 100 on the display unit 114.

In step S1702, the user operates the operational unit 113 to perform various settings while viewing the display unit 114. The CPU 102 receives a setting in response to the operation and performs a corresponding process in each processing unit of the image processing device 100. Here, the user can set an output mode of distance information using the operational unit 113 serving as a selection unit.

That is, the user can select a setting of, for example, a highly accurate distance information output mode or the like as the output mode. The highly accurate distance information output mode is a mode in which the distance information is divided and superimposed on a plurality of data streams to be output, as described in the first embodiment.

The user may use the operational unit 113 to select whether the distance information is superimposed on the data stream of the alpha channel (the A stream). The user is assumed to be able to select whether a grayscale output mode for the grayscale display or a heatmap display mode for the heatmap display, as described in the second embodiment, is set as an output mode other than the highly accurate distance information output mode.

In this way, in the present embodiment, whether to divide and superimpose the distance information on a plurality of data streams or one data stream can be selected with the operational unit 113 serving as a selection unit. Further, when the distance information is superimposed on one data stream, whether to superimpose the distance information on a data stream of luminance or a data stream of color can be selected with the operational unit 113.

In step S1703, the CPU 102 determines whether the mode selected in step S1702 is the highly accurate distance information output mode. When the mode in which the distance information is output is the highly accurate distance information output mode, the process proceeds to step S1704. When the mode is not the highly accurate distance information output mode, the process proceeds to step S1705.

In step S1704, the process described in the first embodiment is performed to superimpose information indicating that the mode in which the distance information is output is the highly accurate distance information output mode and auxiliary data related to a data structure to be output on the distance information, as illustrated in FIG. 7, and outputs the superimposed distance information from the image output unit 109. That is, in step S1704, the distance information is divided and superimposed on a plurality of data streams of Y (luminance) data and C (color) data.

Conversely, in step S1705, the CPU 102 determines whether the mode selected in step S1702 is the grayscale output mode or the heatmap output mode. When the selected mode is the grayscale output mode, the process proceeds to step S1706. When the selected mode is the heatmap output mode, the process proceeds to step S1707.

In step S1706, the process described in the second embodiment is performed to superimpose information indicating that the selected ode is the grayscale output mode and auxiliary data related to a data structure to be output on the distance information, as illustrated in FIG. 11, and outputs the superimposed distance information from the image output unit 109. That is, in step S1706, the distance information is superimposed on the data stream of luminance.

In step S1707, the process described in the second embodiment is performed to superimpose information indicating that the selected mode is the heatmap output mode and auxiliary data related to a data structure to be output on the distance information, as illustrated in FIG. 13, and outputs the superimposed distance information from the image output unit 109. That is, in step S1707, the distance information is superimposed on the data stream of color.

By performing the above-described processes, the user can output the distance information in a desired format. In the present embodiment, the example in which the output schemes described in the first and second embodiments are selected for output have been described. Further, the output scheme described in the third embodiment may be selected for output.

Fifth Embodiment

In the first to fourth embodiments, the example in which the 10-bit or 18-bit distance information is output has been described. However, for example, when a process of performing image combination of postprocessing is a process of inserting a CG image between a plurality of imaged subjects and a way of outputting information with a bit depth less than 10 bits as distance information is used, it is easier to perform postprocessing.

Alternatively, when a way of reducing the bit depth is used, it is easy to view information displayed on an external display. Accordingly, in the fifth embodiment, an example in which the user uses the operational unit 113 to change the bit depth (the number of effective bits) and the distance information corresponding to the set bit depth is output will be described.

Figure 18:
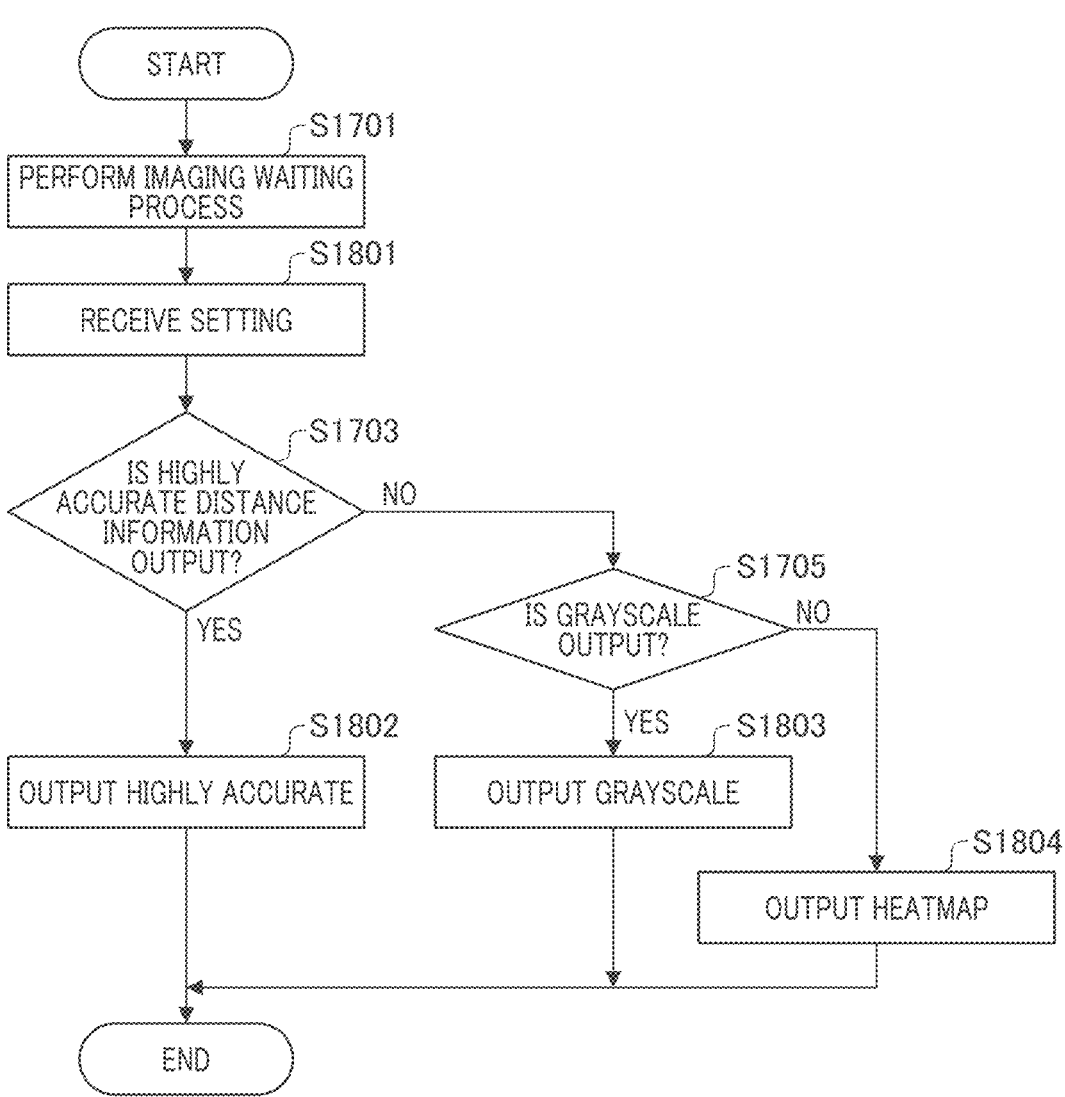
FIG. 18 is a flowchart illustrating an output mode selection process for distance information according to a fifth embodiment.

FIG. 18 is a flowchart illustrating an output mode selection process for distance information according to the fifth embodiment. Each process in the flowchart is implemented by causing the CPU 102 to load and execute a program stored in the ROM 103 on the RAM 104. In the present embodiment, the same reference numerals are given to the same or similar configurations and steps as those of the fourth embodiment and repeated description will be omitted.

In step S1801, while viewing the display unit 114, the user operates the operational unit 113 to change the bit depth (the number of effective bits) of the distance information. The CPU 102 performs a setting or a process in response to the operation in each processing unit of the image processing device 100. Here, the operational unit 113 functions as a number-of-effective-bits selection unit capable of selecting the number of effective bits of the distance information.

Hereinafter, an example of a case in which the number of effective bits of the distance information is set to 3 bits will be described. In step S1802, a process similar to that of the first embodiment is performed to superimpose auxiliary data indicating that a mode in which the distance information is output is the highly accurate distance information output mode and auxiliary data indicating the number of effective bits of the distance information on distance information illustrated in FIG. 19. Then, the distance information is output from the image output unit 109.

FIG. 19 is a diagram illustrating a superimposition example of the distance information in a highly precise distance information output mode according to the fifth embodiment. A value obtained by inverting a value superimposed at the position of Y[8] is superimposed as a value superimposed at the position of Y[9] and a value obtained by inverting a value superimposed at the position of C[8] is superimposed as a value superimposed at the position of C[9].

Then, high-order bits of the distance information in the number of effective bits set in step S1801 are superimposed at positions of Y[8] to Y[0] and C[8] to C[0] and 0 data is superimposed on the other low-order bits.

In step S1803, the process described in the second embodiment is performed to superimpose auxiliary data indicating that the selected mode is the grayscale output mode and the auxiliary data indicating the number of effective bits of the distance information on the distance information, as illustrated in FIG. 20, and output the distance information from the image output unit 109.

FIG. 20 is a diagram illustrating a superimposition example of the distance information in the grayscale output mode according to the fifth embodiment. Distance information D" illustrated in FIG. 20 is a value obtained by outputting the high-order bits of the distance information corresponding to the number of effective bits set in step S1801, embedding the other low-order bits with 0 data, and then performing a process such as the limit process performed in step S1001.

Figure 21:
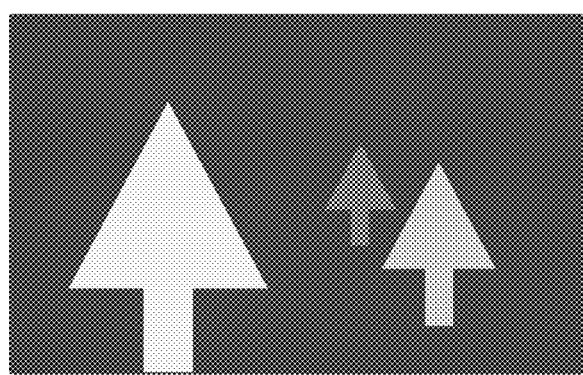
FIG. 21 is a diagram illustrating a display example of the distance information according to the fifth embodiment.

FIG. 21 is a diagram illustrating a display example of the distance information according to the fifth embodiment. When the distance information output in step S1803 is received and displayed on an external display, a plurality of layers divided at each distance and expressed in different luminance are displayed as in FIG. 21.

In step S1804, the process described in the second embodiment is performed to superimpose auxiliary data indicating that the selected mode is the heatmap output mode and the auxiliary data indicating the number of effective bits of the distance information on the distance information, as illustrated in FIG. 22. Then, the distance information is output from the image output unit 109.

Here, FIG. 22 is a diagram illustrating a superimposition example of the distance information in the heatmap output mode according to the fifth embodiment. Distance informa-tion D" illustrated in FIG. 22 is a value obtained by outputting the high-order bits of the distance information corresponding to the number of effective bits set in step S1801, embedding the other low-order bits with 0 data, and then performing a process such as the limit process performed in step S1001.

As described above, by performing the processes according to the present embodiment, the user can select and set the bit depth and output the distance information corresponding to the set bit depth.

In the foregoing embodiments, the examples in which the distance information is superimposed and output in the output format in which the frame rate is 29.97 fps, the horizontal resolution is 1920, and the vertical resolution is 1080, as defined in SMPTE ST 292-1 or SMPTE ST 425-1, have been described.

However, a frame rate or a resolution is not limited to the foregoing example and the distance information may be superimposed and output in another output format.

In each of the above-described embodiments, the case in which the number of transmission path is one has been described, but the present disclosure is not limited thereto. A configuration in which a plurality of transmission paths are prepared and the data of the distance information is output using a transmission path different from the transmission path for an image may be adopted. A transmission technology is not limited to the SDI. A transmission technology such as HDMI (registered trademark), DisplayPort (registered trademark), USB, or LAN capable of performing image transmission may be used or a plurality of transmission paths may be prepared in combination thereof.

The output unit according to the present embodiment includes a unit that outputs (supplies) a data stream in which an image, distance information, and auxiliary data are superimposed to the outside via a memory.

For example, the first to fifth embodiments may be appropriately combined partially. A menu may be displayed on the display unit 114 of the image processing device 100 so that the user can appropriately select the functions described in the first to fifth embodiments or a combination of the functions.

While the present disclosure has been described with reference to exemplary embodiments, it is to be understood that the disclosure is not limited to the disclosed embodiments. The scope of the following claims is to be accorded the broadest interpretation to encompass all such modifications and equivalent structures and functions. In addition, as a part or the whole of the control according to the embodiments, a computer program realizing the function of the embodiments described above may be supplied to the image processing device through a network or various storage media. Then, a computer (or a CPU, an MPU, or the like) of the image processing device may be configured to read and execute the program. In such a case, the program and the storage medium storing the program configure the present disclosure.

This application claims the benefit of Japanese Patent Application No. 2022-001906 filed on Jan. 7, 2022, which is hereby incorporated by reference herein in its entirety.

What is claimed is:

1. An image processing device comprising:
an image acquisition device configured to acquire an image containing a subject via a lens unit;
a memory storing instructions; and
at least one processor executing the instructions causing the image processing device to:

acquire distance information indicating a distance to the subject;

generate auxiliary data related to the distance information;

generate a data stream conforming to a transmission standard of a serial digital interface (SDI) in which the image, the distance information, and the auxiliary data are superimposed; and output the data stream in conformity with the transmission standard of the SDI to outside the image processing device, wherein the at least one processor executing the instructions further causes the image processing device to superimpose the distance information on a data stream of luminance or a data stream of color, wherein an image format for transmission is YCbCr422, wherein (1) the distance information is superimposed in Cr and a red gradation of the distance information is displayed on an external display, or (2) the distance information is superimposed in Cb and a blue gradation of the distance information is displayed on the external display, and wherein in the image format for transmission Cb and Cr are alternately superimposed on C data for each word.

2. The image processing device according to claim 1, wherein the image acquisition device includes an image sensor in which a plurality of photoelectric conversion units receiving light fluxes passing through different pupil regions of the lens unit are arranged for each pixel, and wherein the distance information is acquired based on a phase difference between outputs of the plurality of photoelectric conversion units.

3. The image processing device according to claim 2, wherein the image is acquired by adding the outputs of the plurality of photoelectric conversion units.

4. The image processing device according to claim 1, wherein the at least one processor executing the instructions further causing the image processing device to divide and superimpose the distance information on a plurality of data streams.

5. The image processing device according to claim 1, wherein the at least one processor executing the instructions further causing the image processing device to superimpose the distance information on a data stream of an alpha channel.

6. The image processing device according to claim 1, wherein the at least one processor executing the instructions further causing the image processing device to select whether the distance information is divided and superimposed on a plurality of data streams or the distance information is superimposed on one data stream.

7. The image processing device according to claim 6, wherein the at least one processor executing the instructions further causing the image processing device to select whether the distance information is superimposed on a data stream of luminance or the distance information is superimposed on a data stream of color.

8. The image processing device according to claim 6, wherein the at least one processor executing the instructions further causing the image processing device to select whether the distance information is superimposed on a data steam of an alpha channel.

9. The image processing device according to claim 1, wherein the at least one processor executing the instructions further causing the image processing device to select a number of effective bits of the distance information.

10. The image processing device according to claim 1, wherein the at least one processor executing the instructions further causing the image processing device to superimpose high-order bits of the distance information in a number of effective bits and superimpose 0 on low-order bits.

11. The image processing device according to claim 1, wherein the auxiliary data includes data regarding setting data or a state of the image processing device.

12. The image processing device according to claim 1, wherein the auxiliary data includes lens information regarding the lens unit.

13. The image processing device according to claim 12, wherein the lens information includes at least one of focal distance, a focusing position, and diaphragm information.

14. The image processing device according to claim 1, wherein the auxiliary data includes data for synchronizing the image and the distance information.

15. The image processing device according to claim 1, wherein the auxiliary data includes data indicating an attribute of the distance information.

16. The image processing device according to claim 1, wherein the auxiliary data includes information regarding a data structure of the data stream.

17. The image processing device according to claim 1, wherein the data stream includes still image data.

18. The image processing device according to claim 1, wherein the at least one processor executing the instructions further causing the image processing device to perform the superimposition by multiplexing or mixing.

19. The image processing device according to claim 1, wherein when the distance information exceeds a threshold, the distance information is superimposed in Cb and a fixed value is superimposed in Cr, and when the distance information is less than the threshold, the distance information is superimposed in Cr and the fixed value is superimposed in Cb, or when the distance information exceeds a threshold, the distance information is superimposed in Cr and a fixed value is superimposed in Cb, and when the distance information is less than the threshold, the distance information is superimposed in Cb and the fixed value is superimposed in Cr.

20. The image processing device according to claim 1, wherein the distance information is superimposed at positions of both Y data and C data, and both luminance and color changed in accordance with a value of the distance information are displayed on the external display.

21. A method of controlling an image processing device, the method comprising:

acquiring an image containing a subject via a lens unit;

acquiring distance information indicating a distance to the subject;

generating auxiliary data related to the distance information;

generating a data stream conforming to a transmission standard of a serial digital interface (SDI) in which the image, the distance information, and the auxiliary data are superimposed; and outputting the data stream in conformity with the transmission standard of the SDI to outside the image processing device, wherein the distance information is superimposed on a data stream of luminance or a data stream of color, wherein an image format for transmission is YCbCr422, wherein (1) the distance information is superimposed in Cr and a red gradation of the distance information is displayed on an external display, or (2) the distance information is superimposed in Cb and a blue gradation of the distance information is displayed on the external display, and wherein in the image format for transmission Cb and Cr are alternately superimposed on C data for each word.

22. A non-transitory computer-readable storage medium configured to store a computer program comprising instructions for executing a method of controlling an image processing device, the method comprising:

acquiring an image containing a subject via a lens unit;

acquiring distance information indicating a distance to the subject;

generating auxiliary data related to the distance information;

generating a data stream conforming to a transmission standard of a serial digital interface (SDI) in which the image, the distance information, and the auxiliary data are superimposed; and outputting the data stream in conformity with the transmission standard of the SDI to outside the image processing device, wherein the distance information is superimposed on a data stream of luminance or a data stream of color, wherein an image format for transmission is YCbCr422, wherein (1) the distance information is superimposed in Cr and a red gradation of the distance information is displayed on an external display, or (2) the distance information is superimposed in Cb and a blue gradation of the distance information is displayed on the external display, and wherein in the image format for transmission Cb and Cr are alternately superimposed on C data for each word.

23. An image processing device comprising:

an image acquisition device configured to acquire an image containing a subject via a lens unit;

a memory storing instructions; and at least one processor executing the instructions causing the image processing device to:

acquire distance information indicating a distance to the subject;

generate auxiliary data related to the distance information;

generate a data stream conforming to a transmission standard of a serial digital interface (SDI) in which the image, the distance information, and the auxiliary data are superimposed; and output the data stream in conformity with the transmission standard of the SDI to outside the image processing device, wherein the at least one processor executing the instructions further causes the image processing device to superimpose high-order bits of the distance information in a number of effective bits and superimpose 0 on low-order bits, wherein an image format for transmission is YCbCr422, and wherein in the image format for transmission Cb and Cr are alternately superimposed on C data for each word.

24. A method of controlling an image processing device, the method comprising:

acquiring an image containing a subject via a lens unit;

acquiring distance information indicating a distance to the subject;

generating auxiliary data related to the distance information;

generating a data stream conforming to a transmission standard of a serial digital interface (SDI) in which the image, the distance information, and the auxiliary data are superimposed;

outputting the data stream in conformity with the transmission standard of the SDI to outside the image processing device; and superimposing high-order bits of the distance information in a number of effective bits and superimposing 0 on low-order bits, wherein an image format for transmission is YCbCr422, and wherein in the image format for transmission Cb and Cr are alternately superimposed on C data for each word.

* * * * *